US010530856B2

(12) United States Patent  
Verma et al.

(10) Patent No.: US 10,530,856 B2  
(45) Date of Patent: Jan. 7, 2020

(54) SHARING DATA BETWEEN A PLURALITY OF SOURCE DEVICES THAT ARE EACH CONNECTED TO A SINK DEVICE

(71) Applicant: QUALCOMM Incorporated, San Diego, CA (US)

(72) Inventors: Lochan Verma, San Diego, CA (US); Vijayalakshmi Raveendran, Del Mar, CA (US); Sampath Kumar Sudi, San Diego, CA (US); Mu-Huan Chiang, San Diego, CA (US); Mina Makar, San Diego, CA (US); Na Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 487 days.

(21) Appl. No.: 15/270,778

(22) Filed: Sep. 20, 2016

(65) Prior Publication Data

US 2017/0230453 A1 Aug. 10, 2017

Related U.S. Application Data

(60) Provisional application No. 62/293,289, filed on Feb. 9, 2016.

(51) Int. Cl.
*H04L 29/08* (2006.01)
*H04L 29/06* (2006.01)
(Continued)

(52) U.S. Cl.
CPC ...... *H04L 67/1095* (2013.01); *H04L 65/1069* (2013.01); *H04L 67/06* (2013.01);
(Continued)

(58) Field of Classification Search
CPC ... H04L 67/1095; H04L 67/06; H04L 67/104; H04L 65/1069; H04W 76/14; H04N 21/23; H04N 21/40; H04N 21/63
See application file for complete search history.

(56) References Cited

U.S. PATENT DOCUMENTS 8,964,783 B2 2/2015 Huang et al.
9,197,680 B2 11/2015 Kafle et al.
(Continued)

FOREIGN PATENT DOCUMENTS

WO WO-2015183560 A1 12/2015

OTHER PUBLICATIONS

De Beule J., "Content Sharing, Syncing, Streaming Protocols for Wi-Fi: Excentis", Aug. 12, 2014, XP055186930, 8 Pages, Retrieved from the Internet: URL:https://www.excentis.com/blogjcontent-sharing-syncing-treaming-protocols-wi-fi.
(Continued)

*Primary Examiner* — Michael A Keller
*Assistant Examiner* — Jsing Forng Lin
(74) *Attorney, Agent, or Firm* — Muncy, Geissler, Olds & Lowe, P.C.

(57) ABSTRACT

In an embodiment, a first media presentation session is established between a first Source and the Sink, and a second media presentation session between a second Source and the Sink. First and second media streams are streamed to the Sink by the first and second Sources, respectively. The Sink presents the first and second media streams in respective portions of a display screen, and detects user input at the Sink that is indicative of a trigger to transfer data originated from the first Source to the second Source. The Sink coordinates with one or both of the first Source and the second Source to facilitate the data to be delivered to the second Source in response to the detection. As a result of the (Continued)

coordination, the second Source receives the first Source-originated data (e.g., from the first Source directly, or via the Sink).

54 Claims, 13 Drawing Sheets

(51) Int. Cl.
  *H04W 76/14* (2018.01)
  *H04N 21/23* (2011.01)
  *H04N 21/40* (2011.01)
  *H04N 21/63* (2011.01)
(52) U.S. Cl.
  CPC ........... *H04L 67/104* (2013.01); *H04N 21/23* (2013.01); *H04N 21/40* (2013.01); *H04N 21/63* (2013.01); *H04W 76/14* (2018.02)

(56) References Cited

U.S. PATENT DOCUMENTS

| | | | | |
|---|---|---|---|---|
| 2014/0032677 | A1* | 1/2014 | Pittenger | H04L 12/1831 709/205 |
| 2014/0032771 | A1* | 1/2014 | Pegg | H04L 67/1091 709/228 |
| 2014/0215358 | A1* | 7/2014 | Uratani | G06F 3/048 715/753 |
| 2014/0365611 | A1* | 12/2014 | Praveenkumar | H04L 69/24 709/219 |
| 2015/0067549 | A1* | 3/2015 | Chang | G06F 3/0488 715/761 |
| 2015/0074568 | A1* | 3/2015 | Kwon | H04M 1/576 715/764 |
| 2015/0249714 | A1* | 9/2015 | Vedula | H04L 65/4015 709/228 |
| 2015/0350288 | A1 | 12/2015 | Verma et al. | |
| 2015/0363153 | A1 | 12/2015 | Kato et al. | |
| 2015/0378665 | A1* | 12/2015 | Han | H04N 21/4126 345/2.2 |
| 2017/0026820 | A1* | 1/2017 | Han | H04W 76/14 |

OTHER PUBLICATIONS

International Search Report and Written Opinion—PCT/US2016/064331—ISA/EPO—dated Apr. 4, 2017.
Partial International Search Report and Written Opinion—PCT/US2016/064331—ISA/EPO—dated Feb. 20, 2017.
Sankara J., "Top 5 Remote Desktop Apps for MAC", Aug. 3, 2015, XP055343635, 6 pages. Internet Retrieved from the Internet: URL:http://www.macheat.comjtop-5-remote-desktop-apps-for-mac-os-/.

* cited by examiner

SHARING DATA BETWEEN A PLURALITY OF SOURCE DEVICES THAT ARE EACH CONNECTED TO A SINK DEVICE

CROSS-REFERENCE TO RELATED APPLICATIONS

The present Application for Patent claims the benefit of U.S. Provisional Application No. 62/293,289, entitled "SHARING DATA BETWEEN A PLURALITY OF SOURCE DEVICES THAT ARE EACH CONNECTED TO A SINK DEVICE", filed Feb. 9, 2016, which is by the same inventors as the subject application, assigned to the assignee hereof and hereby expressly incorporated by reference herein in its entirety.

BACKGROUND

1. Field of the Disclosure

Embodiments relate to sharing data between a plurality of source devices that are each connected to a sink device.

2. Description of the Related Art

Various protocols exist for streaming media (e.g., video, audio, etc.) over local wireless networks (e.g., infrastructure Wireless Local Area Networks (WLANs), etc.). One example is Version R1 of Miracast (hereinafter, "Miracast-R1"), which defines a protocol by which a source device (hereinafter "Source", such as a UE such as a phone, laptop, etc.) can connect to an external display device (referred to as a sink device or "Sink") using a WiFi Direct connection. Miracast-R2 is a newer version of Miracast that is currently under development and which is considering support for multiple Sources connected to a single Sink (many-to-one) and a single Source connected to multiple Sinks (one-to-many). While Miracast-R1 and Miracast-R2 support the transfer of media from Source(s) to Sink(s), Miracast-R1 and Miracast-R2 do not currently support or facilitate different Sources to exchange data with each other. Similarly, other protocols (e.g., Chromecast, Airplay, etc.) for connecting and transferring of media from Source(s) to Sink(s) also do not support or facilitate such functionality.

SUMMARY

An embodiment is directed to a method of facilitating a transfer of data between a plurality of Sources that are each connected to a Sink, including establishing a first media presentation session between a first Source and the Sink, establishing a second media presentation session between a second Source and the Sink, receiving a first media stream for the first media presentation session from the first Source for presentation on the Sink via a first local media connection type, receiving a second media stream for the second media presentation session from the second Source for presentation on the Sink via a second local media connection type, presenting the first and second media streams in first and second portions, respectively, of a display screen of the Sink, detecting user input at the Sink that is indicative of a trigger to transfer data originated from the first Source to the second Source and coordinating with one or both of the first Source and the second Source to facilitate the data to be delivered to the second Source in response to the detecting.

Another embodiment is directed to a method of transferring data between a plurality of Sources that are each connected to a Sink, including establishing a first media presentation session between a first Source and the Sink, transmitting, via a local media connection type, a first media stream for the first media presentation session to the Sink for presentation thereon in conjunction with presentation of a second media stream for a second media presentation session between a second Source and the Sink and coordinating with the Sink to transmit data from the first Source for delivery to the second Source.

Another embodiment is directed to a method of transferring data between a plurality of Sources that are each connected to a Sink, including establishing a first media presentation session between a first Source and the Sink, transmitting, via a local media connection type, a first media stream for the first media presentation session to the Sink for presentation thereon in conjunction with presentation of a second media stream for a second media presentation session between a second Source and the Sink and receiving data from the second Source based on coordination with the Sink.

Another embodiment is directed to a Sink configured to facilitate a transfer of data between a plurality of Sources that are each connected to the Sink, including means for establishing a first media presentation session between a first Source and the Sink, means for establishing a second media presentation session between a second Source and the Sink, means for receiving a first media stream for the first media presentation session from the first Source for presentation on the Sink via a first local media connection type, means for receiving a second media stream for the second media presentation session from the second Source for presentation on the Sink via a second local media connection type, means for presenting the first and second media streams in first and second portions, respectively, of a display screen of the Sink, means for detecting user input at the Sink that is indicative of a trigger to transfer data originated from the first Source to the second Source and means for coordinating with one or both of the first Source and the second Source to facilitate the data to be delivered to the second Source in response to the detection.

Another embodiment is directed to a first Source among a plurality of Sources that are each connected to a Sink, including means for establishing a first media presentation session between the first Source and the Sink, means for transmitting, via a local media connection type, a first media stream for the first media presentation session to the Sink for presentation thereon in conjunction with presentation of a second media stream for a second media presentation session between a second Source and the Sink and means for coordinating with the Sink to transmit data from the first Source for delivery to the second Source.

Another embodiment is directed to a first Source among a plurality of Sources that are each connected to a Sink, including means for establishing a first media presentation session between the first Source and the Sink, means for transmitting, via a local media connection type, a first media stream for the first media presentation session to the Sink for presentation thereon in conjunction with presentation of a second media stream for a second media presentation session between a second Source and the Sink and means for receiving data from the second Source based on coordination with the Sink.

Another embodiment is directed to a Sink configured to facilitate a transfer of data between a plurality of Sources that are each connected to the Sink, including at least one communications interface configured to establish a first media presentation session between a first Source and the Sink, to establish a second media presentation session between a second Source and the Sink, to receive a first media stream for the first media presentation session from the first Source for presentation on the Sink via a first local media connection type, and to receive a second media stream for the second media presentation session from the second Source for presentation on the Sink via a second local media connection type, at least one user interface (UI) output component configured to present the first and second media streams in first and second portions, respectively, of a display screen of the Sink and at least one UI input component configured to detect user input at the Sink that is indicative of a trigger to transfer data originated from the first Source to the second Source, wherein the at least one communications interface is further configured to coordinate with one or both of the first Source and the second Source to facilitate the data to be delivered to the second Source in response to the detection.

Another embodiment is directed to a first Source among a plurality of Sources that are each connected to a Sink, including at least one communications interface configured to establish a first media presentation session between the first Source and the Sink, to transmit, via a local media connection type, a first media stream for the first media presentation session to the Sink for presentation thereon in conjunction with presentation of a second media stream for a second media presentation session between a second Source and the Sink, and to coordinate with the Sink to transmit data from the first Source for delivery to the second Source.

Another embodiment is directed to a first Source among a plurality of Sources that are each connected to a Sink, including at least one communications interface configured to establish a first media presentation session between the first Source and the Sink, to transmit, via a local media connection type, a first media stream for the first media presentation session to the Sink for presentation thereon in conjunction with presentation of a second media stream for a second media presentation session between a second Source and the Sink, and to receive data from the second Source based on coordination with the Sink.

Another embodiment is directed to a non-transitory computer-readable medium containing instructions stored thereon, which, when executed by a Sink configured to facilitate a transfer of data between a plurality of Sources that are each connected to the Sink, cause the Sink to perform operations, the instructions including at least one instruction configured to cause the Sink to establish a first media presentation session between a first Source and the Sink, at least one instruction configured to cause the Sink to establish a second media presentation session between a second Source and the Sink, at least one instruction configured to cause the Sink to receive a first media stream for the first media presentation session from the first Source for presentation on the Sink via a first local media connection type, at least one instruction configured to cause the Sink to receive a second media stream for the second media presentation session from the second Source for presentation on the Sink via a second local media connection type, at least one instruction configured to cause the Sink to present the first and second media streams in first and second portions, respectively, of a display screen of the Sink, at least one instruction configured to cause the Sink to detect user input at the Sink that is indicative of a trigger to transfer data originated from the first Source to the second Source and at least one instruction configured to cause the Sink to coordinate with one or both of the first Source and the second Source to facilitate the data to be delivered to the second Source in response to the detection.

Another embodiment is directed to a non-transitory computer-readable medium containing instructions stored thereon, which, when executed by a first Source among a plurality of Sources that are each connected to a Sink, cause the first Source to perform operations, the instructions including at least one instruction configured to cause the first Source to establish a first media presentation session between the first Source and the Sink, at least one instruction configured to cause the first Source to transmit, via a local media connection type, a first media stream for the first media presentation session to the Sink for presentation thereon in conjunction with presentation of a second media stream for a second media presentation session between a second Source and the Sink and at least one instruction configured to cause the first Source to coordinate with the Sink to transmit data from the first Source for delivery to the second Source.

Another embodiment is directed to a non-transitory computer-readable medium containing instructions stored thereon, which, when executed by a first Source among a plurality of Sources that are each connected to a Sink, cause the first Source to perform operations, the instructions including at least one instruction configured to cause the first Source to establish a first media presentation session between the first Source and the Sink, at least one instruction configured to cause the first Source to transmit, via a local media connection type, a first media stream for the first media presentation session to the Sink for presentation thereon in conjunction with presentation of a second media stream for a second media presentation session between a second Source and the Sink and at least one instruction configured to cause the first Source to receive data from the second Source based on coordination with the Sink.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1A:
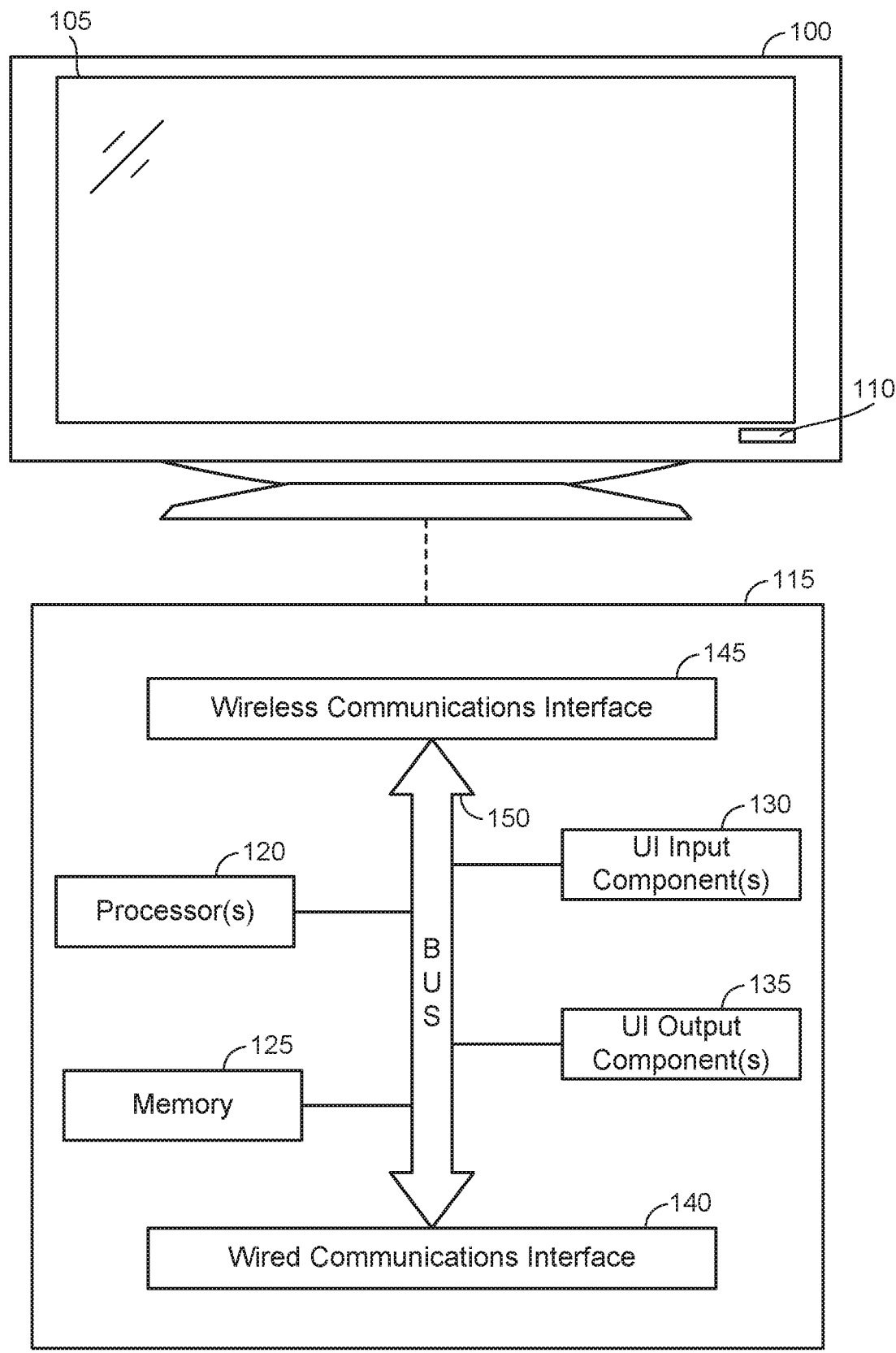
FIG. 1A illustrates a Sink in accordance with an embodiment of the disclosure.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

In various embodiments of the disclosure, UEs can be configured to connect (e.g., via a local wireless media connection type (e.g., Miracast, Chromecast, Airplay, etc.), via a local wired media connection type physical cables such as DisplayPort or HDMI, etc.) to a media presentation device so that the UEs can transmit media to the media presentation device for presentation thereon. When this type of connection is established, each of the UEs is characterized as a source device (hereinafter, "Source") and the media presentation device is characterized as a sink device (hereinafter, "Sink").

FIG. 1A illustrates a Sink 100 in accordance with an embodiment of the disclosure. The Sink 100 includes a display screen 105 and a power button 110. A hardware configuration of the Sink 100 is depicted with respect to platform 115. The platform 115 includes one or more processors 120 (e.g., one or more application specific integrated circuit (ASICs), one or more digital signal processors (DSPs), etc.) and a memory 125 (e.g., RAM, ROM, EEPROM, flash cards, or any memory common to computer platforms). The platform 115 also includes one or more UI input components 130 (e.g., supporting the power button 110 as well as other optional features such as a Menu buttons, Volume control button(s) if the Sink 100 supports audio, a microphone, etc.) and/or one or more UI output components 135 (e.g., supporting the display screen 105 and also optional features such as speakers if the Sink 100 supports audio, etc.).

The platform 115 further includes a wired communications interface 140 and a wireless communications interface 145. In an example embodiment, the wired communications interface 140 can be used to support wired local media connections to Sources (e.g., USB, HDMI, DVI, VGA, DisplayPort, etc.) and/or to a wired access network (e.g., via an Ethernet cable or another type of cable that can function as a bridge to the wired access network such as HDMI v1.4 or higher, etc.). In another example embodiment, the wireless communications interface 145 includes one or more wireless transceivers for communication in accordance with a local wireless communications protocol (e.g., WLAN or WiFi, WiFi Direct, Bluetooth, etc.). The wireless communications interface 145 also optionally includes one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network). The various components 120-145 of the platform 115 can communicate with each other via a bus 150. Referring to FIG. 1A, in at least one embodiment, the Sink 100 may correspond to a Smart Monitor (e.g., the Dell 23 Wireless Monitor or the Dell 24 Wireless Monitor) that supports a Wireless Docking function with respect to multiple Sources concurrently. The features of the Sink 100 in FIG. 1A are to be considered merely illustrative and the disclosure is not limited to the illustrated features or arrangement.

As noted above, in the particular embodiment where the Sink 100 of FIG. 1A corresponds to a Smart Monitor, the Smart Monitor can implement a Wireless Docking function. Wireless Docking refers to a mechanism for extending a user interface of a client device (or Source) to the Smart Monitor, where the user can then manipulate the UI input component(s) 130 that are coupled to the Smart Monitor itself. For example, the UI input component(s) 130 of the Smart Monitor may be coupled to a keyboard and a mouse. A smartphone would not normally have access to the keyboard and the mouse. However, in an example, by wirelessly docking itself to the Smart Monitor and mirroring the display screen of the smartphone onto the Smart Monitor itself, the user can manipulate the keyboard and the mouse coupled to the Smart Monitor to control the smartphone (e.g., any user input from the keyboard and mouse would be relayed back to the smartphone which interprets this user input and updates the screen accordingly). Accordingly, in at least one embodiment, the Smart Monitor is an intelligent display with human interface devices (e.g., keyboard, mouse, remote, etc.). Sources (e.g., smartphones, tablet computers, etc.) can dock (e.g., via a wireless connection such as Bluetooth, WiFi, etc.) to the Smart Monitor and mirror their respective screens on the Smart Monitor. At this point, the user may use the interface devices connected (either wirelessly or wired) to the Smart Monitor in-lieu of touchscreens on the phone (e.g., making control over content simpler relative to a touchscreen interface of the smartphone, etc.).

Figure 1B:
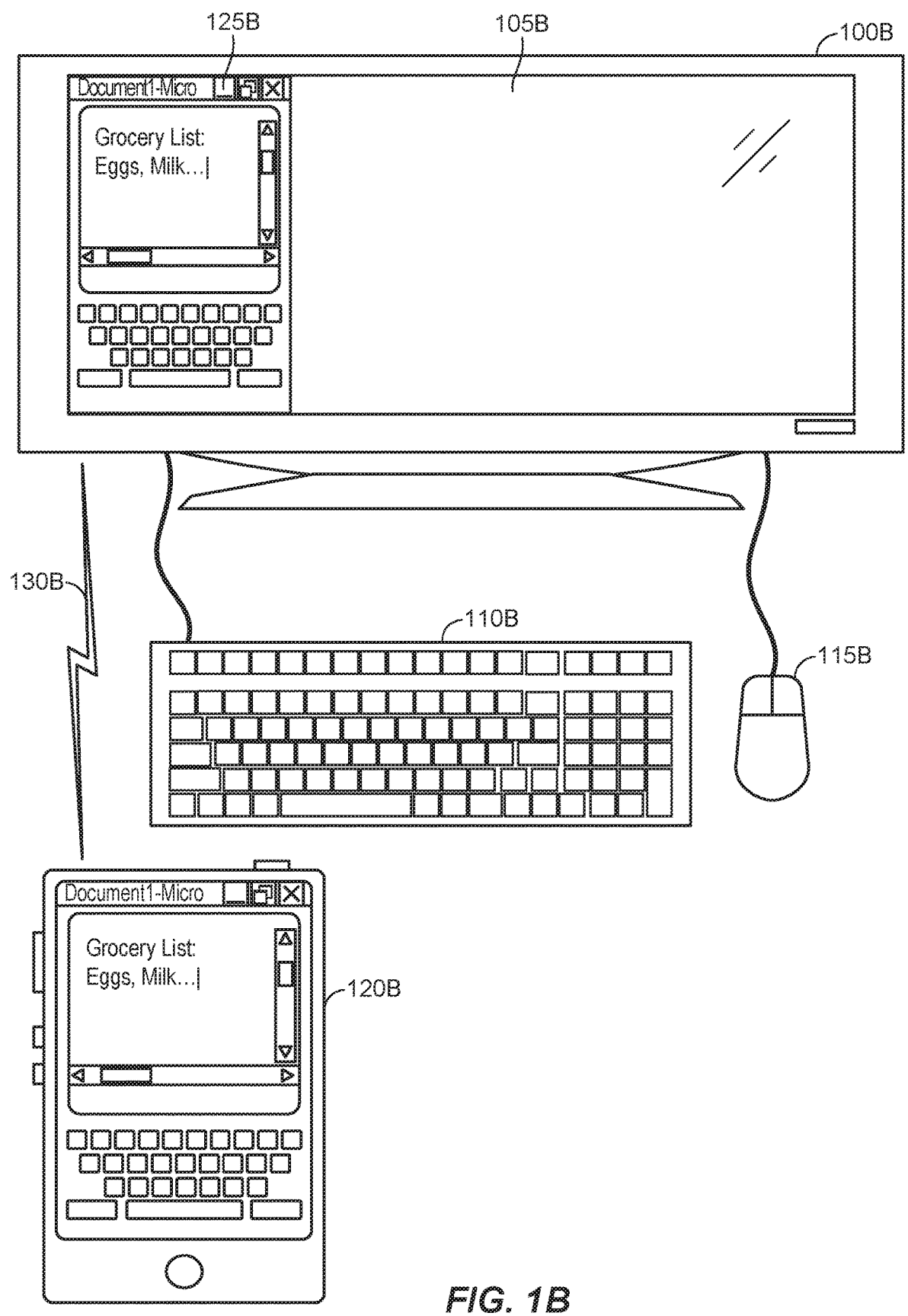
FIG. 1B illustrates a Wireless Docking function performed by a Smart Monitor in accordance with an embodiment of the disclosure.

An example of the above-noted Wireless Docking function is depicted in FIG. 1B. In FIG. 1B, a Smart Monitor 100B includes a display screen 105B and is coupled to a keyboard 110B and a mouse 115B. A Source 120B (e.g., a smartphone or tablet computer) is shown as wirelessly docked with the Smart Monitor 100B, with a display screen of the Source 120B being mirrored within window 125B of the display screen 105B of the Smart Monitor 100B via a wireless connection 130B, which is acting as a Sink for the screen-sharing session (e.g., a Miracast, Chromecast or Airplay session, etc., as discussed below in more detail). By wirelessly docking the Source 120B to the Smart Monitor 100B, an operator of the Source 120B gains access to more robust UI features, in this case, the keyboard 110B and mouse 115B.

Figure 2:
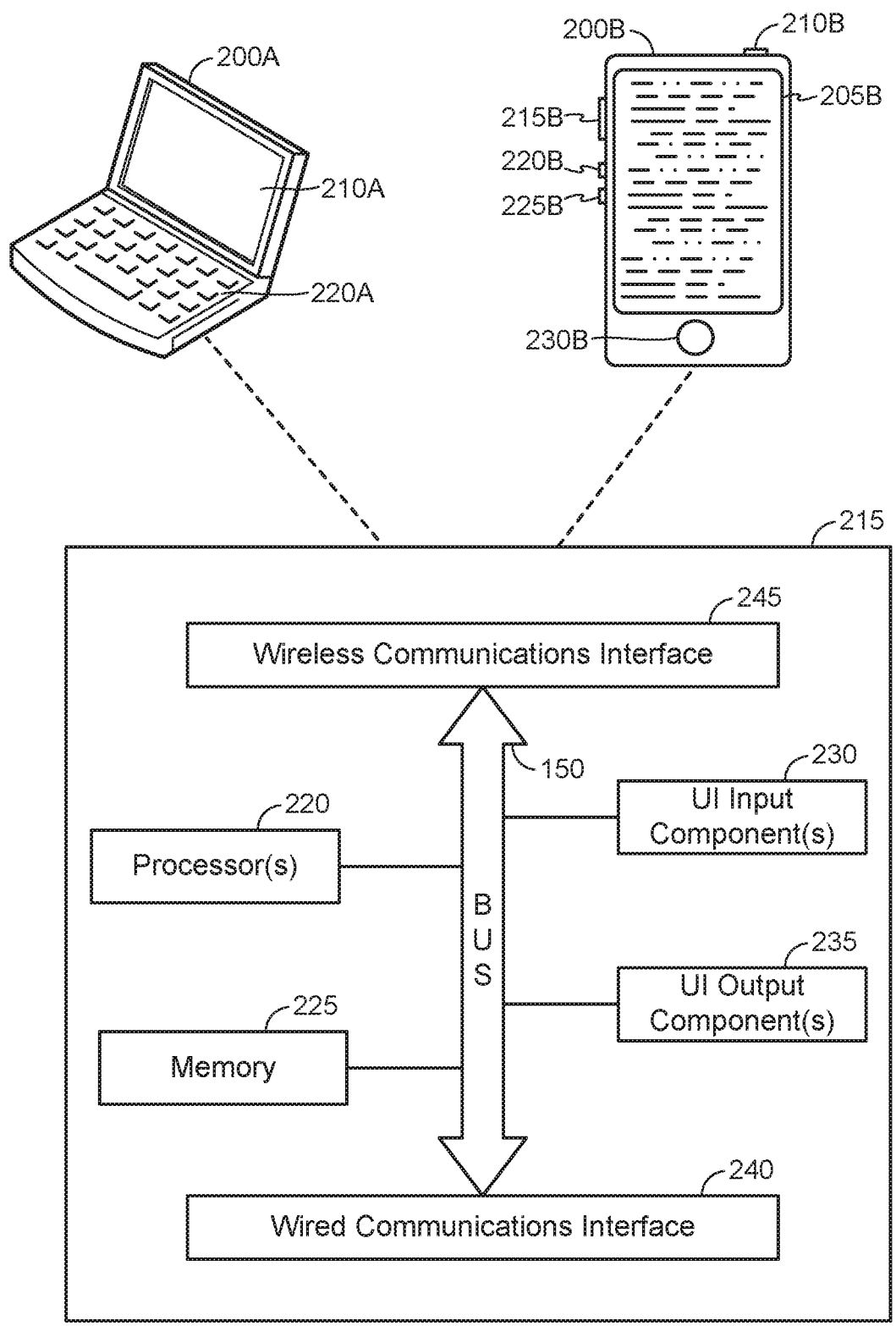
FIG. 2 illustrates Sources in accordance with an embodiment of the disclosure.

FIG. 2 illustrates Sources 200A and 200B in accordance with an embodiment of the disclosure. Referring to FIG. 2, Source 200A is illustrated as a laptop computer and Source 200B is illustrated as a touchscreen device (e.g., a smart phone, a tablet computer, etc.). As shown in FIG. 2, an external casing of Source 200A is configured with display 210A and a keyboard 220A among other components, as is known in the art. Also, an external casing of Source 200B is configured with a touchscreen display 205B, peripheral buttons 210B, 215B, 220B and 225B (e.g., a power control button, a volume or vibrate control button, an airplane mode toggle button, etc.), and at least one front-panel button 230B (e.g., a Home button, etc.), among other components, as is known in the art. While not shown explicitly as part of Sources 200A or 200B, Sources 200A and 200B can include one or more external antennas and/or one or more integrated antennas, including but not limited to WiFi antennas, cellular antennas, satellite position system (SPS) antennas (e.g., global positioning system (GPS) antennas), and so on. While not shown explicitly in FIG. 2, other types of Sources may include desktop computers, smart watches and/or any other type of device that is capable of sending media to a Sink (e.g., such as Sink 100 of FIG. 1A) for presentation thereon.

While components of Sources such as Sources 200A and 200B can be embodied with different hardware configurations, a basic high-level UE configuration for hardware components is shown as platform 215 in FIG. 2. The platform 215 includes one or more processors 220 (e.g., one or more application specific integrated circuit (ASICs), one or more digital signal processors (DSPs), etc.) and a memory 225 (e.g., RAM, ROM, EEPROM, flash cards, or any memory common to computer platforms). The platform 215 also includes one or more UI input components 230 (e.g., supporting the keyboard 220A, the buttons 210B-225B, etc.) and/or one or more UI output components 235 (e.g., supporting the display screens 210A and/or 205B, etc.).

The platform 215 further includes a wired communications interface 240 and a wireless communications interface 245. In an example embodiment, the wired communications interface 240 can be used to support wired local media connections to Sinks or other types of devices (e.g., USB, HDMI, DVI, VGA, DisplayPort, etc.) and/or to a wired access network (e.g., via an Ethernet cable, etc.). The wireless communications interface 245 includes one or more wireless transceivers for communication in accordance with a local wireless communications protocol (e.g., WLAN or WiFi, WiFi Direct, Bluetooth, etc.). The wireless communications interface 245 also optionally includes one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network). The various components 220-245 of the platform 215 can communicate with each other via a bus 250. The features of the Sources 200A and 200B in FIG. 2 are to be considered merely illustrative and the disclosure is not limited to the illustrated features or arrangement.

Figure 3:
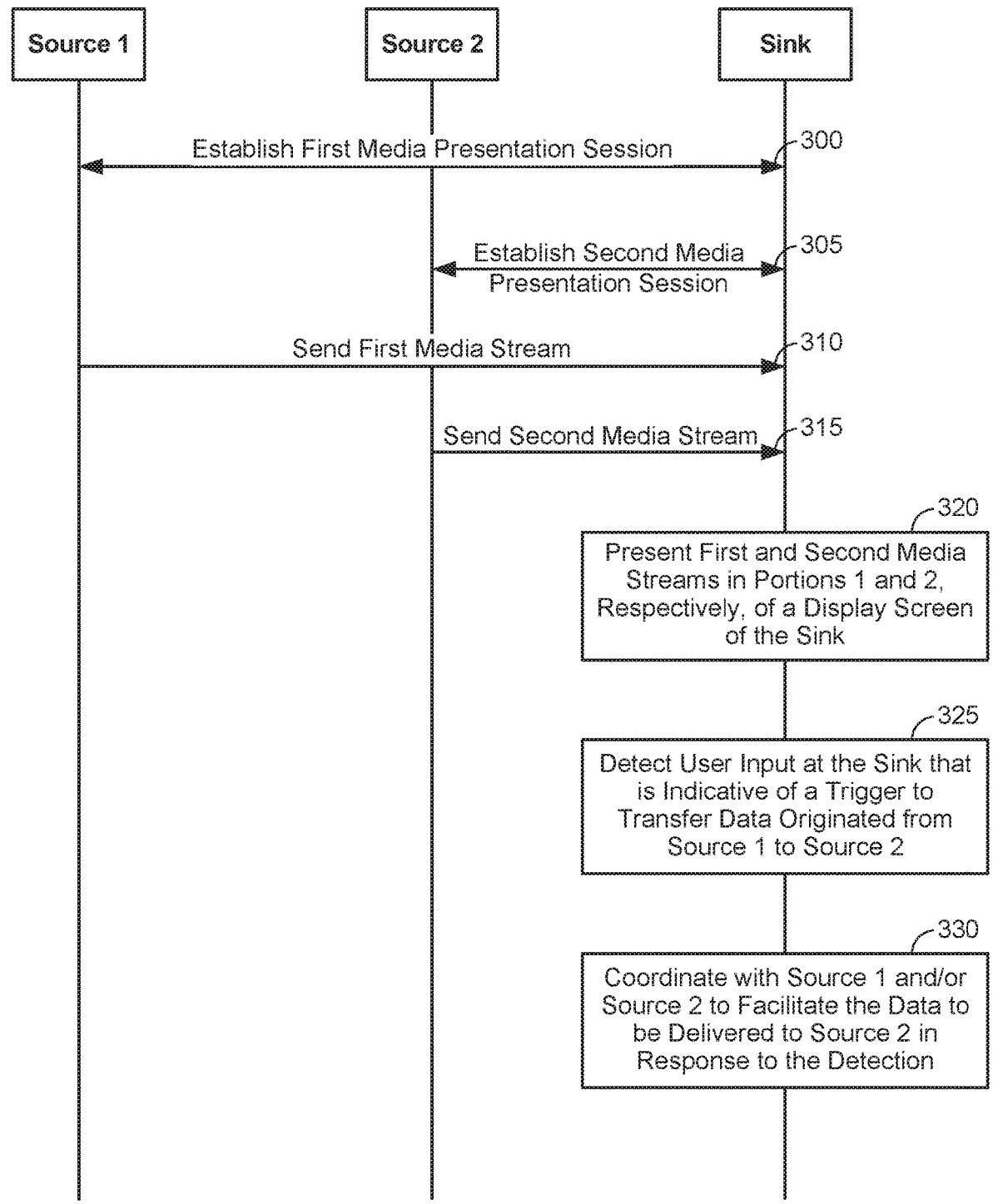
FIG. 3 illustrates a process of exchanging data between a plurality of Sources that are each connected to a common Sink in accordance with an embodiment of the disclosure.

FIG. 3 illustrates a process of exchanging data between a plurality of Sources that are each connected to a common Sink in accordance with an embodiment of the disclosure. Referring to FIG. 3, Source 1 establishes a first media presentation session with a Sink at block 300, and Source 2 establishes a second media presentation session with the Sink at block 305. In the embodiment of FIG. 3, Sources 1 and 2 may or may not be part of a shared peer-to-peer (P2P) group, such as a WiFi Direct or 802.1ac/ad group. If Sources 1 and 2 are part of a shared P2P group, Sources 1 and 2 may be capable of exchanging data with each other directly over a respective P2P connection. As used herein, a "P2P" connection can refer to a direct or device-to-device (D2D) connection between Sources 1 and 2, or alternatively to an indirect connection between Sources 1 and 2 (e.g., a multi-hop connection that involves routing of data via one or more intermediate peer devices, or even a remote data transfer connection that may be AP-mediated or server-mediated, such as email and so on). Generally, if a P2P connection is used, mediation of the data transfer or data exchange is not handled by the Sink.

With respect to FIG. 3, each of the first and second media presentation sessions (e.g., Miracast, Chromecast or Airplay sessions, PAL-supported wired sessions, etc.) support a Source-to-Sink media stream channel (e.g., screen mirroring) and/or a Sink-to-Source user input feedback channel. In Miracast, the Sink-to-Source user input feedback channel is referred to as the User Input Back Channel (UIBC). The UIBC permits user input that is detected at the Sink to be relayed back to the corresponding Source that provides the media being displayed where the user input is detected (e.g., a particular window that displays Source 1's screen on the Sink can be deemed "active" so that user inputs received while Source 1's window is active is relayed specifically back to Source 1 and not Source 2). For example, a user may move a pointer around a window being displayed by the Sink (e.g., via a touchscreen of the Sink, a mouse connected to the Sink, etc.) that is screen-mirroring a display screen of Source 1, and the Sink can report the pointer location back to Source 1 so that the pointer can be moved accordingly. The Sink thereby does not necessarily move the pointer itself, but rather reports the relevant user input feedback back to the relevant Source via the user input feedback channel so that the Source itself can update the pointer location, after which the pointer is moved by the Source based on the user input feedback which then causes the Source's media stream to be updated to reflect the new pointer location via screen-mirroring. Other user input feedback that can be relayed from the Sink back to the Source via the user input feedback channel is when a user clicks on a particular location in the Source's window, keyboard entries (e.g., if the Sink is equipped with a keyboard) and so on. Accordingly, any type of user input that the Sink is capable of obtaining may potentially be reported back to the Source whose window is active on the Sink when the user input is detected. Some of this functionality relies upon the Sink being implemented as a "Smart" Sink with enhanced functionality relative to certain legacy monitors that support a display-only function without any content analysis, as discussed below in more detail.

Figure 4:
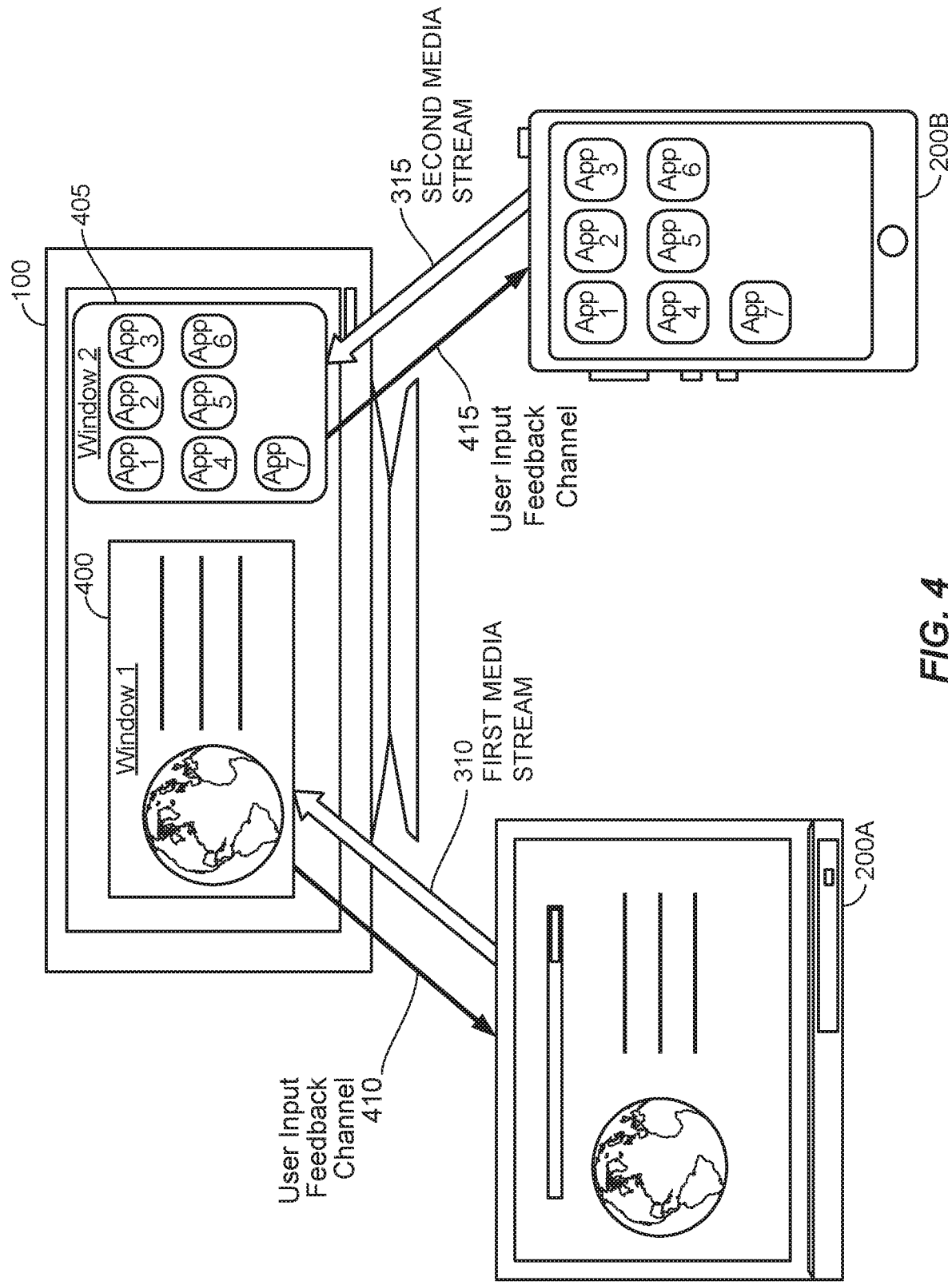
FIG. 4 illustrate concurrent media presentation sessions between two Sources and a Sink in accordance with an embodiment of the disclosure.

Source 1 sends a first media stream to the Sink at block 310, and Source 2 sends a second media stream to the Sink at block 315. The Sink presents the first and second media streams in Portions 1 and 2 (e.g., windows as shown in FIG. 4), respectively, of a display screen of the Sink at block 320. In an example, the first and second media streams include any type of data that is sufficient to cause the Sink to present Portions 1 and 2 at block 320. For example, the first and second media streams may include ready-to-display video content that the Sink outputs in the corresponding Portions 1 and 2 of the display screen. In this case, the Sink need not execute the underlying application(s) associated with the media streams, but rather simply outputs the media streams as video. In an alternative example, at least one of the first and second media streams can include control data that relies in part upon the control data being processed at the Sink. For example, Source 1 and the Sink may each execute a similar or identical client application that is controlling the content being displayed on Source 1. In this example, instead of sending the screen-capture video of Source 1 to the Sink for reproduction, Source 1 can send application-specific control data that can be processed at the Sink to produce a similar result (e.g., for a clock application, a change from 12:01 to 12:02 only requires a small message to be sent between corresponding clock applications on Source 1 and the Sink as opposed to video media). Accordingly, the "media stream" aspect is intended to be interpreted broadly so as to cover any type of data that can be sent by the Source to cause particular target media to be reproduced at the Sink.

An example implementation of block 320 is depicted in FIG. 4. In FIG. 4, the Sources 200A and 200B correspond to Sources 1 and 2, respectively, of FIG. 3, the Sink of FIG. 3 corresponds to Sink 100, and Portions 1 and 2 from block 320 correspond to windows 400 and 405. The embodiment of FIG. 4 illustrates a specific example where the media being rendered locally on the Sources 200A and 200B is being cloned (or screen-mirrored) within respective windows 400 and 405 on the Sink 100. For example, the Source 200A is displaying a web browser, and the first media stream transmitted to the Sink 100 at block 310 causes the web browser to be displayed within the window 400 of the Sink 100. Also, the Source 200B is displaying a mobile application listing (e.g., App 1, App 2, etc.), and the second media stream transmitted to the Sink 100 at block 315 causes the application listing to be displayed within the window 405 of the Sink 100. As shown in FIG. 4, each Source has a Source-to-Sink media stream channel and a Sink-to-Source user input feedback channel. As will be appreciated, screen-cloning is only one type of possible media presentation session, and other embodiments can be directed to other types of media presentation sessions.

Turning back to FIG. 3, at block 325, at some point while the first and second media presentation sessions are still active, user input is detected at the Sink that is indicative of a trigger to transfer data originated from Source 1 to Source 2. The trigger at block 325 can be indicated in a number of different ways based upon the Sink being configured as a "Smart" Sink (or Smart Monitor). Most conventional monitors are implemented as "dumb" playback machines that do not actually inspect user input received thereon and/or the media being rendered thereon. However, Smart Sinks, such as the Sink 100 of FIG. 1A and the Sink being described with respect to FIG. 3, are configured to inspect and recognize certain aspects in user input that is received at the Sink as well as the media being presented thereon. Examples of enhanced functionality that can be implemented by Smart Sinks, such as the Sink 100 and the Sink described with respect to FIG. 4, can include any of the following:

Recognize pointer movements both within individual displayed windows and across different displayed windows at the Sink;

Recognize when text, tabs (e.g., pulldown menus in a displayed document, etc.) and/or a file icon in a displayed window are highlighted;

Recognize when a user left/right clicks or presses a particular point of a displayed window;

Recognize short-cut commands (e.g., a copy command such as CTRL-C, a paste command such as CTRL-V, etc.) obtained via a user input interface of the Sink;

Recognize spoken commands (e.g., a user speaks "Copy" and/or "Paste" into a microphone coupled to the Sink, with an audio recognition module at the Sink converting the user's speech into corresponding Copy and Paste commands);

Recognize movement of content such as when a particular file is being 'dragged' between different displayed windows for a "drag-n-drop" operation based upon a combination of clicks and pointer movements;

In various embodiments, to facilitate some of the above-noted functionality of the Sink, the Sink may be provisioned with a multi-window pointer that is configured to be moved across both Portions 1 and 2. In an example, when the multi-window pointer is positioned in Portion 1, then Portion 1 is determined to be an active portion and movement of the multi-window pointer inside of Portion 1 is reported back to Source 1 via the user input feedback channel so that Source 1 can map movement of the multi-window pointer to Source 1's own pointer. Likewise, in another example, when the multi-window pointer is positioned in Portion 2, then Portion 2 is becomes the active portion and movement of the multi-window pointer inside of Portion 2 is reported back to Source 2 via the user input feedback so that Source 2 can map movement of the multi-window pointer to Source 2's own pointer. In addition to Source-specific pointer control based on active window status, other types of user input (e.g., left/right clicks with a mouse connected to the Sink, touch-based selections via a touchscreen of the Sink, keyboard inputs such as CTRL-C and CTRL-V, etc.) are relayed specifically back to the Source with the current active portion in the Sink. It is also possible for certain types of user input to be universal (e.g., a shutdown command may trigger all Sources to shut down and not merely the Source with the current active window, etc.).

Once the enhanced functionality of a Smart Sink is appreciated, the numerous ways in which the trigger can be indicated at block 325 will be understood. A few non-limiting examples of the trigger are as follows:

A file in Portion 1 being displayed on the Sink is dragged into a "transit region" between Portions 1 and 2 of the Sink, after which the user "drops" the file at a particular location in Portion 2 to infer that the user wants to drag-n-drop this file from Source 1 to Source 2. In a further example, the position of the cursor (or pointer) when the user "drops" the file in Portion 2 may be reported to Source 2 so as to designate a target file storage location for the to-be-copied file;

Text in an MS Word document in a displayed window for Source 1 is highlighted, followed by CTRL-C being detected via a user input interface of the Sink while Portion 1 is the active portion, followed by CTRL-V being detected in Portion 2 after Portion 2 becomes the active portion to infer that the text is intended to be copied and pasted (i.e., delivered) to Source 2. In a further example, CTRL-V can be detected in association with the second media stream displayed at Portion 2 in a particular pointer location that can be mapped to text-insert location (e.g., the user opens an MS Word document in Portion 2 and the cursor selects a particular location of the MS Word document when CTRL-V is detected, implying that the user wants the text inserted at this particular location of the MS Word document). As an alternative, a Cut and Paste operation (e.g., CTRL-X followed by CTRL-V) could be implemented in lieu of a Copy and Paste function;

Accordingly, the trigger at block 325 can actually include multiple events which are detected by the Sink (e.g., an initial CTRL-C followed by a CTRL-V in association with a target location for a text-insert, etc.). At block 330, the Sink coordinates with Source 1 and/or Source 2 to facilitate the data to be delivered to Source 2 in response to the detection at block 325.

As will be explained below in more detail, the coordination of block 330 can be implemented in a variety of different ways. For example, Source 1 may send the data directly to the Sink over a first file-transfer connection (e.g., Media Agnostic (MA) USB, etc.) that is separate from a connection (e.g., a Miracast, Chromecast or Airplay connection, an HDMI connection, etc.) used to transport the first media stream, after which the Sink may send the data directly to Source 2 over a second file-transfer connection (e.g., MA USB, etc.) that is separate from a connection (e.g., a Miracast, Chromecast or Airplay connection, an HDMI connection, etc.) used to transport the second media stream. In an alternative example, it is possible that Sources 1 and 2 are part of the same peer-to-peer (P2P) group (e.g., a WiFi Direct group, etc.), in which case the Sink may prompt Source 1, Source 2 or both to share the data with each other directly via a P2P connection. In another alternative example, the data to be sent to Source 2 may already be part of the first media stream, in which case the Sink can execute a "clipboard" operation to locally extract or copy the data from the first media stream for delivery to Source 2 without leveraging a separate file-transfer connection for retrieval of the data from Source 1. These examples are described below in more detail with respect to FIGS. 5-8.

Referring to FIG. 3, the respective connections over which the respective media streams are carried at blocks 310 and 315 may correspond to local wireless connections (e.g., Miracast based on WiFi Direct) or wired connections (e.g., HDMI, DVI, VGA, DisplayPort, USB, etc.). It is possible that certain wired connections could not support the source-to-source data transfer described with respect to block 330. In this case, in an example, if any of the media presentation sessions are implemented via a wired connection, a proprietary Protocol Adaptation Layer (PAL) may be implemented to facilitate the source-to-source data transfer described with respect to block 330. In an alternative example, if one of Sources 1 and 2 have a wired connection to the Sink while the other Source has a wireless connection, the Sink could establish a separate wireless connection to the Source with the wired connection and then send the data to the Source over this wireless connection. Accordingly, in various embodiments, MA USB may be used to facilitate file transfers for Sources with wireless connections to the Sink, while the PAL can be used to facilitate file transfers for Sources with legacy wired connections that would not otherwise support the source-to-source data transfer described with respect to block 340.

Figure 5:
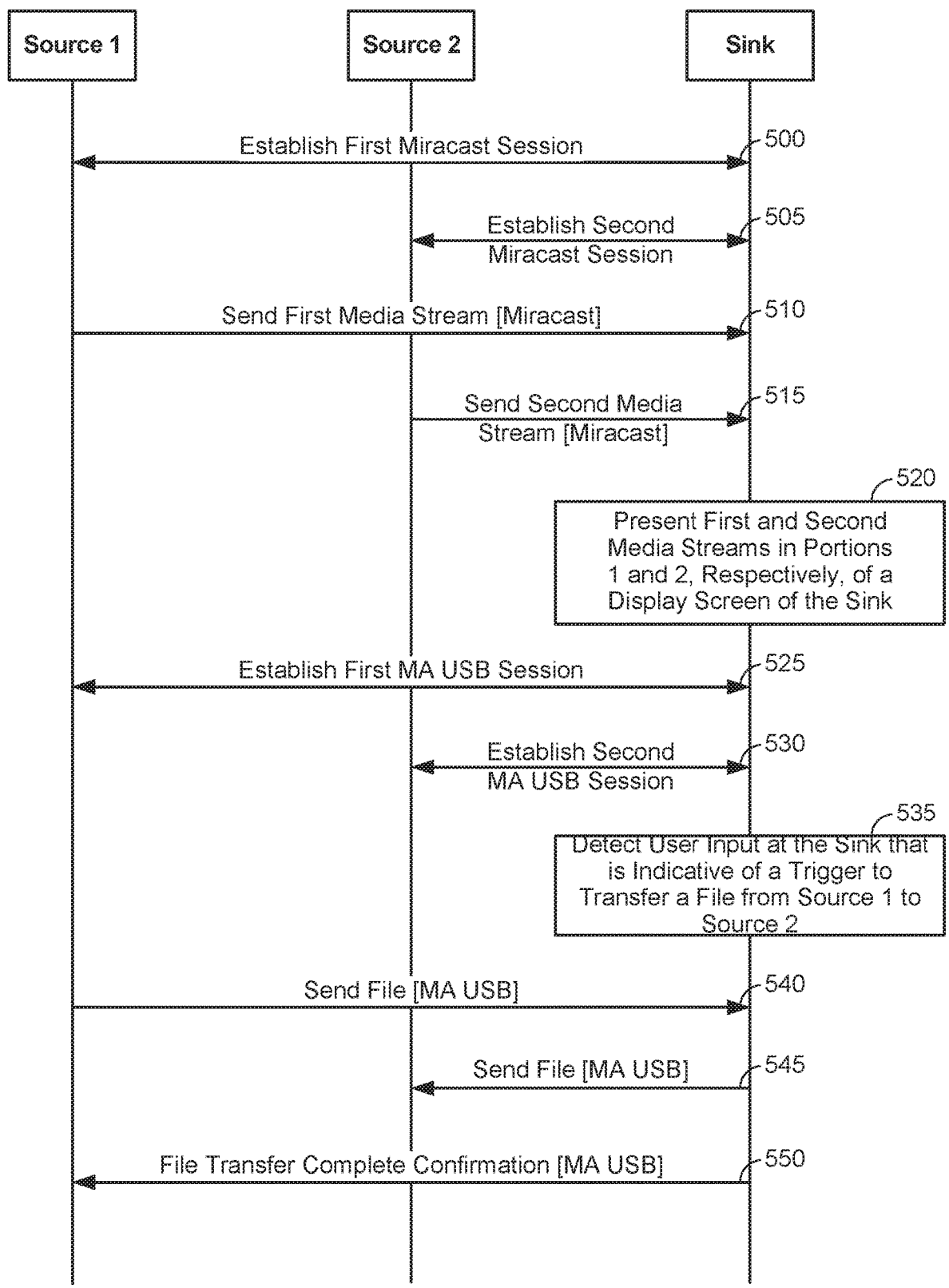
FIG. 5 illustrates an example implementation of the process of FIG. 3 in accordance with an embodiment of the disclosure.

FIG. 5 illustrates an example implementation of the process of FIG. 3 in accordance with an embodiment of the disclosure. The embodiment of FIG. 5 is described whereby the first and second media presentation sessions are supported via Miracast connections between Sources 1 and 2 and the Sink, although as noted above it is possible for Sources 1 and/or 2 to alternatively use a PAL-supported wired connection, and/or wireless connections of a different type (e.g., Chromecast, Airplay, etc.).

Referring to FIG. 5, Source 1 establishes a first Miracast session with a Sink at block 500, and Source 2 establishes a second Miracast session with the Sink at block 505. Source 1 sends a first media stream to the Sink via Miracast at block 510, and Source 2 sends a second media stream to the Sink via Miracast at block 515. The Sink presents the first and second media streams in Portions 1 and 2 (e.g., windows as shown in FIG. 4), respectively, of a display screen of the Sink at block 520. As will be appreciated, blocks 500-520 substantially correspond to blocks 300-320 of FIG. 3 except that blocks 500-520 are specific to Miracast.

Sources 1 and 2 further initiate and establish MA USB connections with the Sink at blocks 525 and 530. In an example, the MA USB connections can be setup in association with setup of the Miracast sessions before a need to transport a file actually arises. In an alternative example, the MA USB connections may be setup opportunistically or on-demand in response to a specific file being identified for transport between a respective Source and the Sink. Accordingly, the particular timing of the setup of the MA USB connections at blocks 525 and 530 can vary.

At block 535, at some point while the first and second media presentation sessions are still active, user input is detected at the Sink that is indicative of a trigger to transfer (e.g., copy) a particular file from Source 1 to Source 2 (e.g., as in block 335 of FIG. 3). At block 540, Source 1 sends the file to the Sink via the MA USB session established at block 525. At block 545, the Sink sends the file to Source 2 via the MA USB session established at block 530. At block 550, the Sink optionally transmits a file transfer complete confirmation to Source 1.

Figure 6:
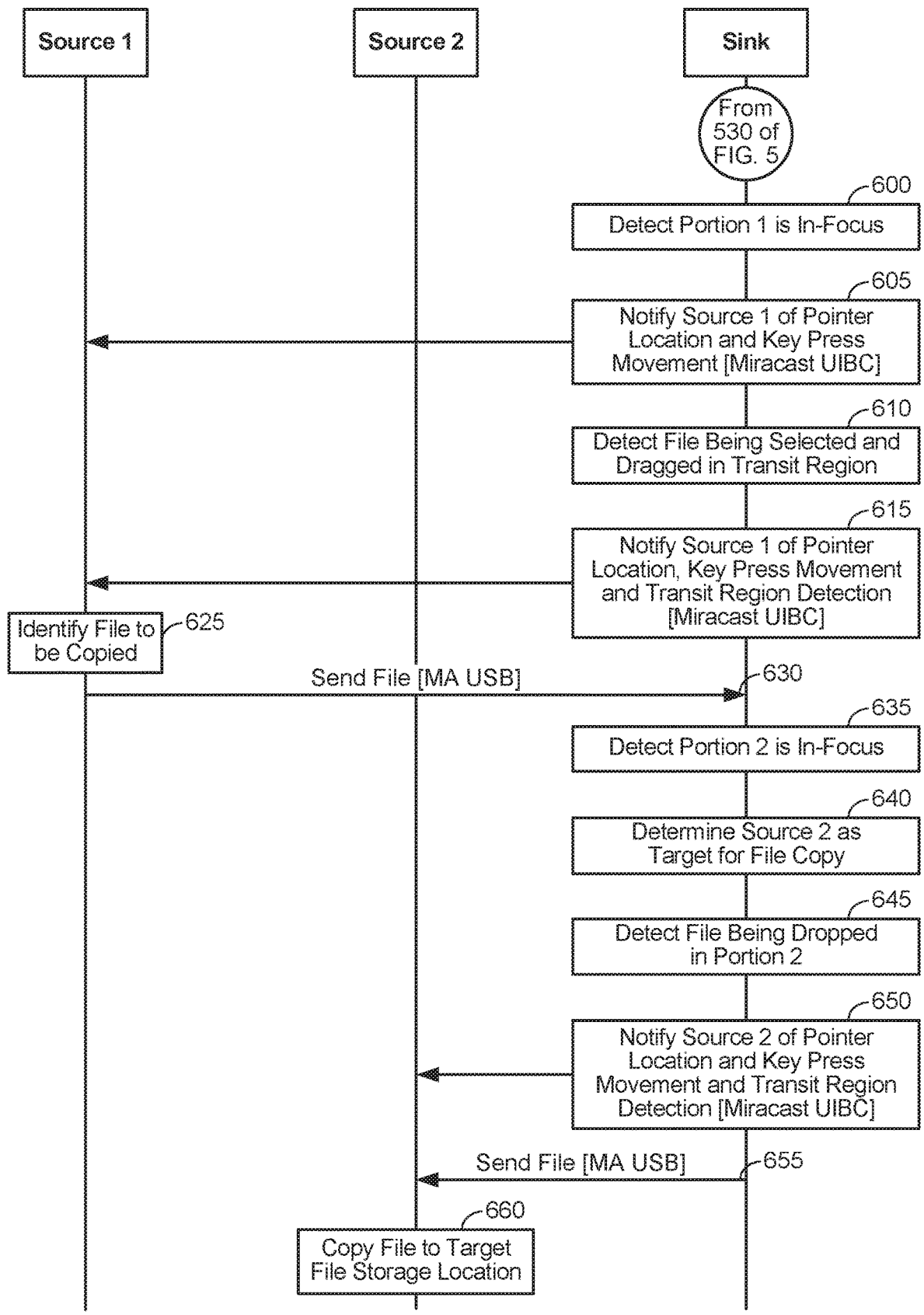
FIG. 6 illustrates a more detailed example implementation of a portion of FIG. 5 in accordance with an embodiment of the disclosure.

FIG. 6 illustrates a more detailed example implementation of blocks 535-545 in accordance with an embodiment of the disclosure. Referring to FIG. 6, at some point after block 530 of FIG. 5, the Sink detects that Portion 1 is in-focus (e.g., Portion 1 corresponds to the active window for which user input is to be attributed). As noted above in an example, one way that Portion 1 can become active (or in-focus) is by a user of the Sink moving the multi-screen pointer into the range of Portion 1 on the display screen of the Sink. While Portion 1 is in-focus, the Sink relays user input that is received by user input interface(s) at the Sink back to Source 1 in a periodic manner (e.g., update pointer location every 5 ms, etc.) an event-triggered manner (e.g., in response to a user performing a click or press operation or inputting a keyboard entry, etc.) or a combination thereof. Accordingly, at block 605, the Sink notifies Source 1 of a current pointer location along with any key press movement that is detected at the Sink. As noted above, block 605 can repeat a number of times while Portion 1 remains in-focus.

Figure 7:
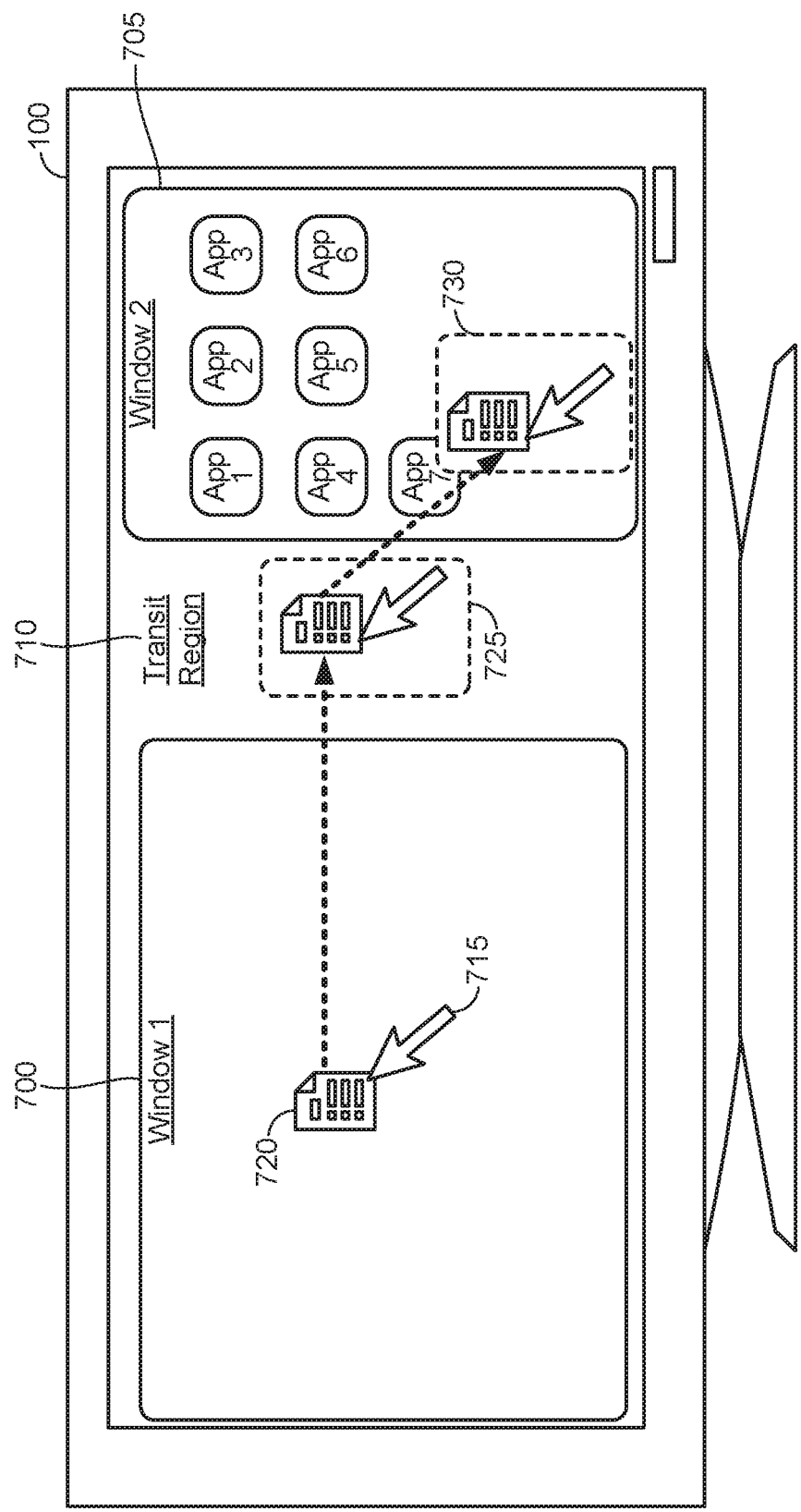
FIG. 7 illustrates an example of a drag-n-drop scenario in accordance with an embodiment of the disclosure.

At block 610, at some point while Portion 1 remains in-focus, the Sink detects that the user has selected a file and dragged the filed into the transition region between Portions 1 and 2 (e.g., corresponding to block 535 of FIG. 5). FIG. 7 illustrates an example of the drag-n-drop scenario described with respect to block 610. In FIG. 7, the Sink of FIG. 6 corresponds to Sink 100, and Portions 1 and 2 from block 320 correspond to windows 700 and 705. A transit region 710 is depicted between windows 700 and 705. First, window 1 is active (or in-focus) by virtue of the multi-screen pointer 715 being positioned in window 1. While window 700 is active, the user of the Sink 100 clicks on file 720 and drags file 720 into the transit region 710 to position 725. At block 615, the Sink notifies Source 1 that the pointer location has entered into the transit region (at this point, Portion 1 is no longer in-focus or active) and that entry into the transit region occurred while the selected file was being dragged by the multi-screen pointer into the transit region. The notification at block 615 puts Source 1 on-notice that the selected file has been targeted for a File Copy operation, and Source 1 thereby identifies the file to be copied in its local memory at block 625 and then, at block 630, Source 1 sends the file to the Sink via the MA USB session established at block 525.

At block 635, the user continues to move the multi-screen pointer until the multi-screen pointer enters Portion 2, which puts Portion 2 in-focus (or active). Also, because Portion 2 becomes in-focus after a file was dragged from another Portion, Source 2 is identified as the target for the File Copy operation at block 640. While not shown in FIG. 6, in an alternative embodiment, Portion 2 can be automatically designated as a target for the File Copy operation in response to block 610 as soon as the file is dragged from Portion 1 into the transit region under certain conditions (e.g., if there are only two media presentation sessions currently active on the Sink, if a default target file storage location for file copies has been designated for Source 2, etc.). At block 645, the user drops (e.g., by unclicking the multi-screen pointer) the file at a particular location of Portion 2. In FIG. 7, the file 720 is dropped at location 730, which is close to the icon for App 7 in window 705. In an example, the location at which the file is dropped can be used to designate a target file storage location for the to-be-copied file at Source 2. In FIG. 7 for example, the target file storage location for the file 720 can correspond to a storage folder associated with App 7 because App 7 is the closest App icon to the drop location in window 705.

At block 650, the Sink notifies Source 2 that the multi-screen pointer moved into Portion 2 while dragging a file from Portion 1 along with the pointer location corresponding to the drop location at which the file was dropped in Portion 2, and, at block 655, the Sink sends the file to Source 2 via the MA USB session established at block 630. At block 660, Source 2 uses the drop location to identify a target file storage location for the file, and Source 2 copies (or saves) the file to the target file storage location.

Figure 8:
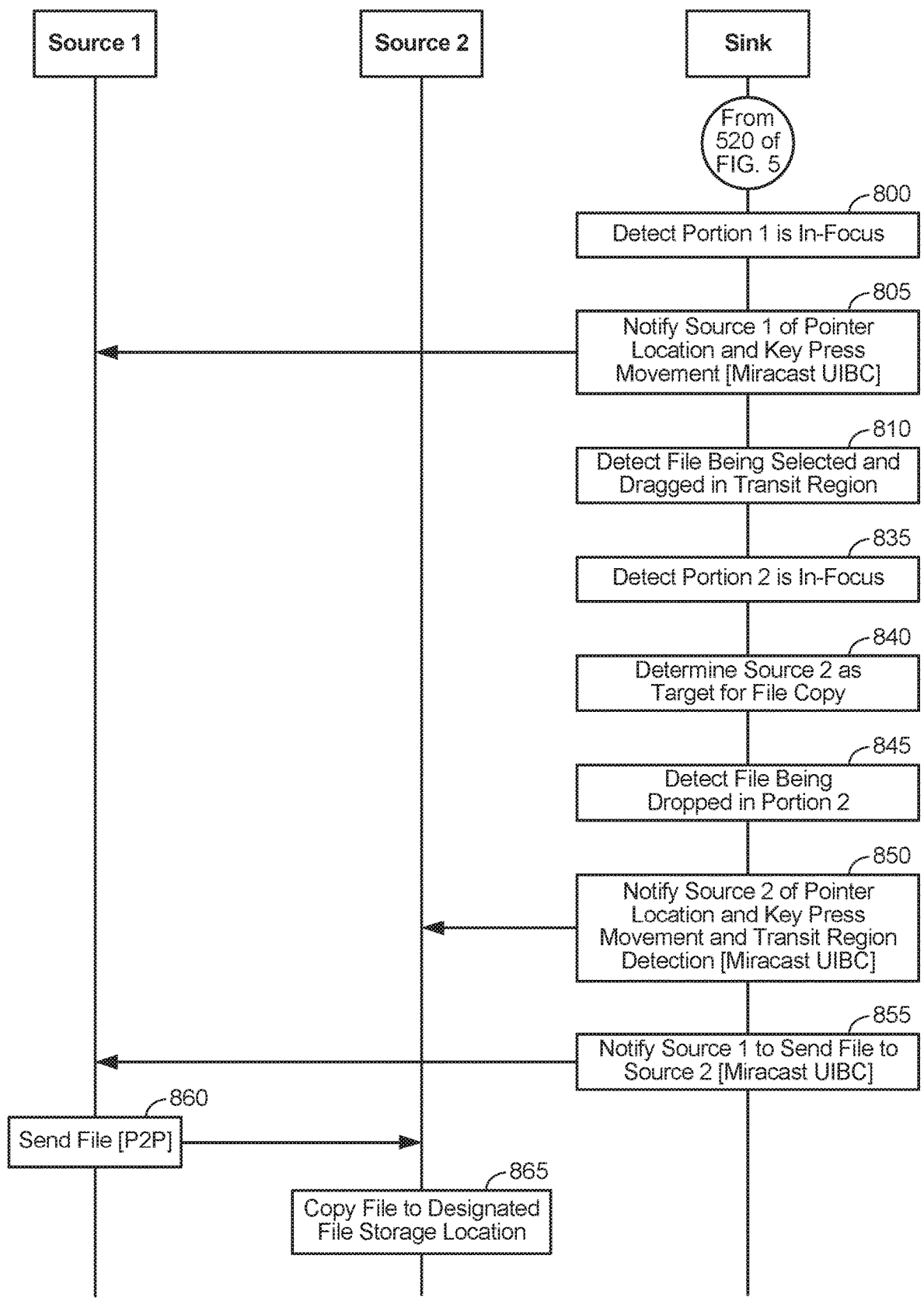
FIG. 8 illustrates an alternative implementation of the process of FIG. 5 whereby the Sink acts a facilitator to prompt Sources to exchange a file via a peer-to-peer (P2P) connection in accordance with an embodiment of the disclosure.

While FIG. 6 illustrates an example implementation of the process of FIG. 5 whereby the Sink acts as a hub that mediates the file transfer between Sources 1 and 2, FIG. 8 illustrates an alternative implementation of the process of FIG. 5 whereby the Sink acts a facilitator to prompt Sources 1 and 2 to exchange the file via a P2P connection in accordance with an embodiment of the disclosure.

Referring to FIG. 8, blocks 800-810 substantially correspond to blocks 600-610 of FIG. 6, except that MA USB connections are optional in FIG. 8 such that block 800 may continue from block 520 of FIG. 5 instead of block 530 of FIG. 5 as in FIG. 6. Aside from this distinction, blocks 800-810 are similar to blocks 600-610 and will not be described further for the sake of brevity. Next, blocks 835-850 substantially correspond to blocks 635-650 of FIG. 6, and will likewise not be discussed further for the sake of brevity.

At block 855, the Sink notifies Source 1 to send the file to Source 2. The notification of block 855 may include an identifier by which Source 1 can identify Source 2 (e.g., an SSID, a MAC ID, etc.). In an example, Source 1 may compare the identifier for Source 2 to a P2P list of a P2P group to which Source 1 belongs (e.g., a WiFi Direct group, etc.). If Source 2 is in the P2P group, Source 1 transmits the file to Source 2 via a P2P interface for the P2P group in block 860. Alternatively, if Source 2 is not in the P2P group, Source 1 may attempt to establish a separate local wireless connection with Source 2 to handle the file transfer at block 860. While not shown in FIG. 8, if Source 2 is unsuccessful in establishing the separate local wireless connection with Source 2, Source 1 may notify the Sink that Source 1 cannot transfer the file to Source 2. This may trigger the Sink to then act as a hub or mediator for the file transfer as in FIG. 6. At block 865, after receiving the file from Source 1, Source 2 uses the drop location from block 850 to identify a target file storage location for the file, and Source 2 copies (or saves) the file to the target file storage location.

Figure 9:
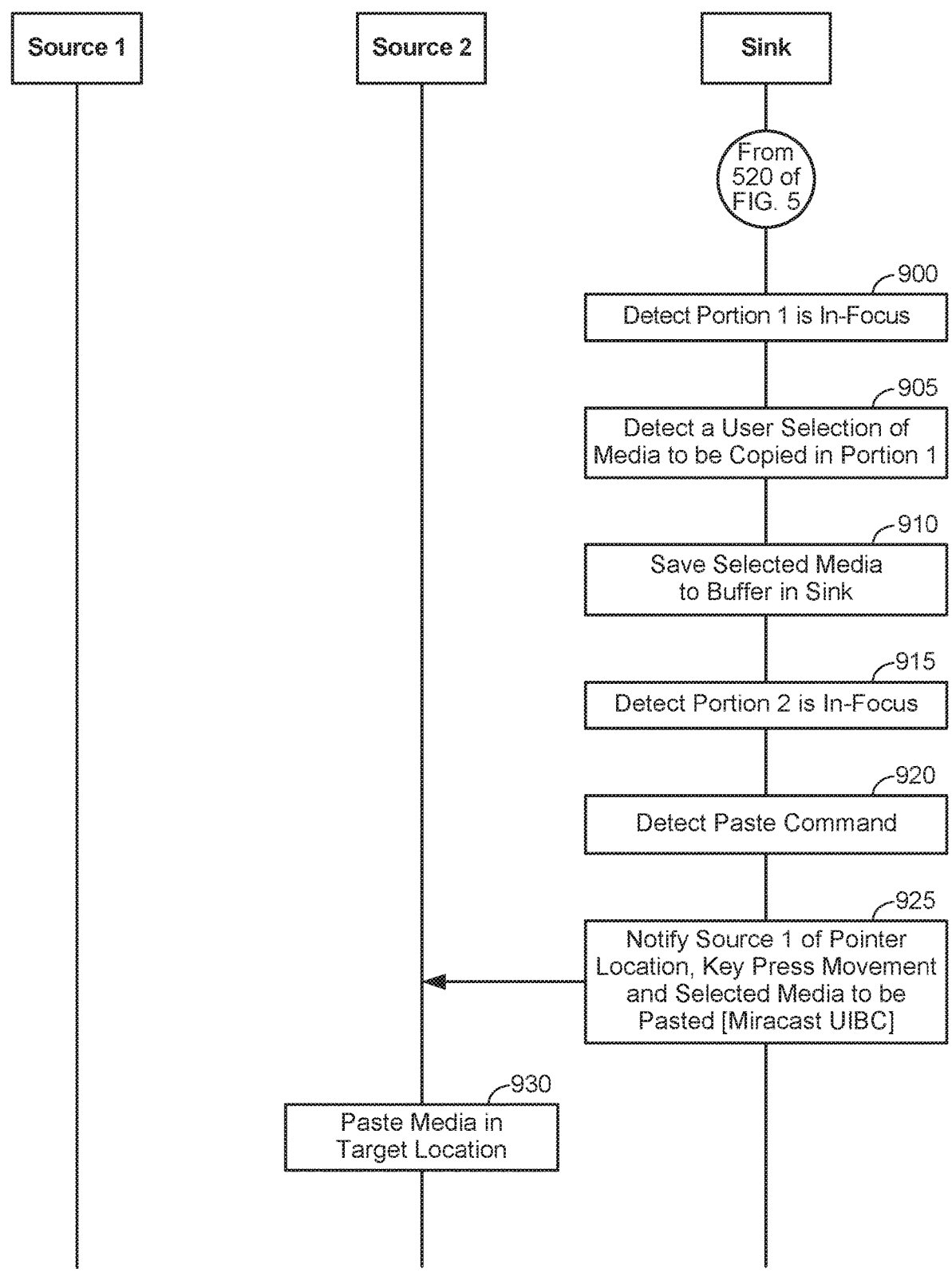
FIG. 9 illustrates another example implementation of FIG. 5 whereby data that originated from a first Source is extracted from the first Source's media presentation session and then delivered to a second Source in accordance with an embodiment of the disclosure.

While FIGS. 6 and 8 illustrate example implementations of the process of FIG. 5 whereby a file stored on Source 1 is retrieved and transferred to Source 2 via a channel that is separate from the media presentation sessions being displayed on the Sink, FIG. 9 illustrates another example implementation of FIG. 5 whereby data that originated from Source 1 is extracted from Source 1's media presentation session itself and then delivered to Source 2 in accordance with an embodiment of the disclosure. The scenario described below with respect to FIG. 9 is thereby analogous to a clipboard or copy/paste function that is implemented with respect to distinct Sources that each have concurrent media presentation sessions active with respect to a common Sink.

Referring to FIG. 9, at some point after block 530 of FIG. 3, the Sink detects that Portion 1 is in-focus (e.g., Portion 1 corresponds to the active window for which user input is to be attributed). As noted above in an example, one way that Portion 1 can become active (or in-focus) is by a user of the Sink moving the multi-screen pointer into the range of Portion 1 on the display screen of the Sink. While Portion 1 is in-focus, the Sink detects a user selection of media (e.g., text media, image media, etc.) to be copied in Portion 1 at block 905. The user selection of media at block 905 can occur in a variety of ways, including but not limited to the following examples:

- The user uses the multi-screen pointer to highlight a section of text (e.g., in an MS Word document, in a web-page, in a chat window, in a filename of a file, etc.). While the section of text is highlighted, a key combination (e.g., CTRL-C) indicative of a Copy function is detected via a user interface (e.g., keyboard) coupled to the Sink;
- The user uses a key combination (e.g., ALT-PRINT SCREEN, etc.) or an image cropping tool to identify some or all of the image content being displayed in Portion 1;
- The Sink is equipped with a touchscreen. The user holds his/her finger to access control options (e.g., similar to right-clicking the screen in a Windows OS environment) and can choose, for example, a Copy function (or a Cut function);
- The Sink is configured to detect gestures (e.g., via a motion detector, a camera, an accelerometer, etc.), and the user can make one or more pre-defined gestures to indicate the user selection; and/or
- The Sink is equipped with a microphone, and the user issues one or more spoken commands to make the user selection (e.g., "copy left-side of active window", "copy text currently on display in Word document", etc.).

The Sink saves the selected media to a local buffer at block 910. The local buffer may be part of the memory 125 of FIG. 1A in an example. At some later point in time, the multi-screen pointer moves to Portion 2 and Portion 2 becomes active or in-focus at block 915. At block 920, while Portion 2 is active or in-focus, the Sink detects a user command (e.g., CTRL-V, etc.) to paste the copied media while the multi-screen pointer is at a particular location of Portion 2. At block 925, the Sink notifies Source 2 with respect to the pointer location where the paste command was detected in Portion 2 along with the selected media over the UIBC. As will be appreciated, the MA USB connection (if established) need not be used for transfer the selected media at block 925, in contrast to the file transmission at block 655 of FIG. 6. In an example, the size of media to be selected via the above-noted "clipboard" functionality may be restricted so as not to overload the UIBC. Source 2 receives the notification from block 925 and, at block 930, pastes the media into the target location designated by the multi-screen pointer location when the paste command was received.

Figure 10:
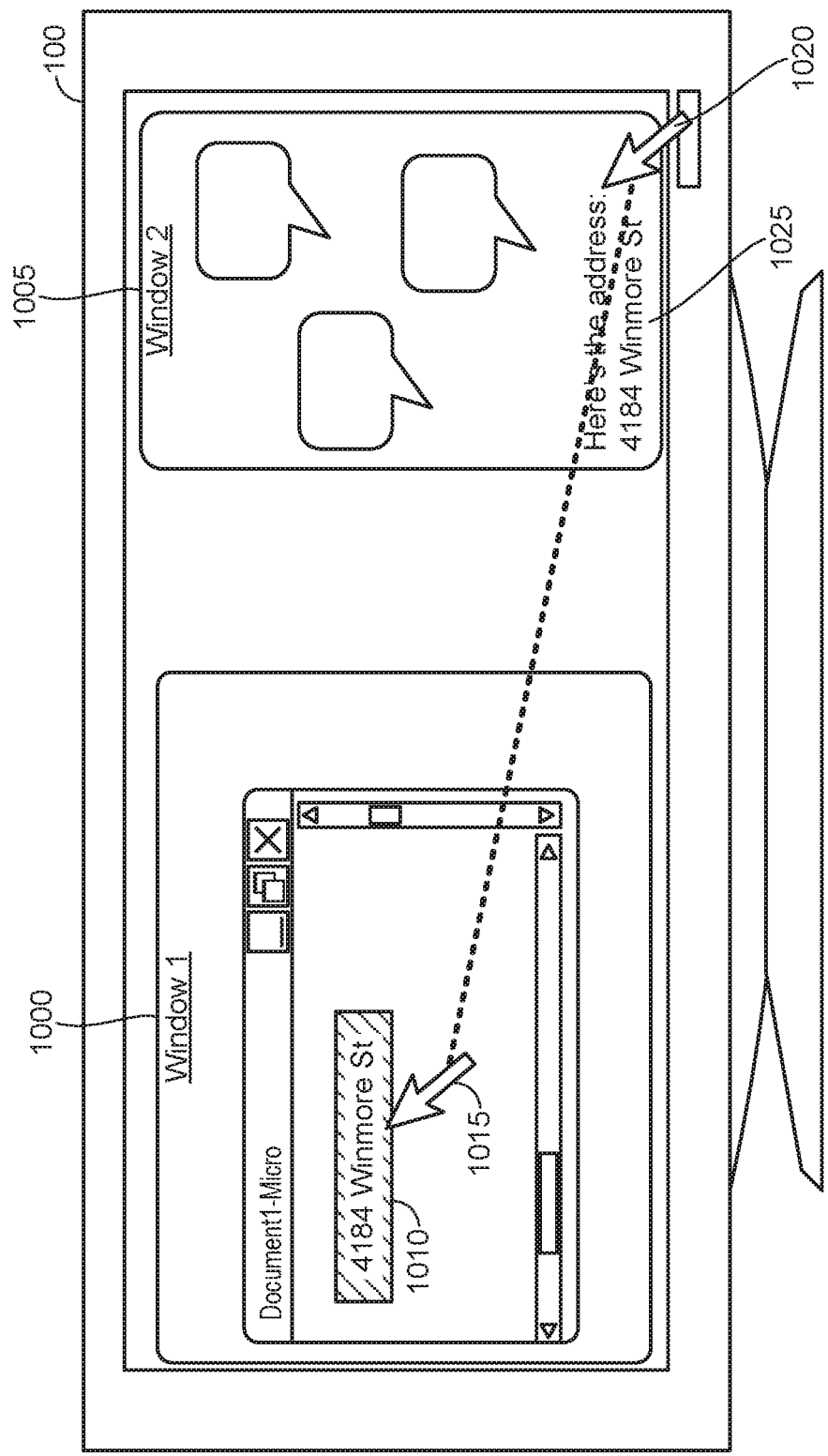
FIG. 10 illustrates a text-specific example of the process of FIG. 9 in accordance with an embodiment of the disclosure.

FIG. 10 illustrates a text-specific example of the process of FIG. 9 in accordance with an embodiment of the disclosure. In FIG. 10, the Sink of FIG. 9 corresponds to Sink 100, and Portions 1 and 2 from block 320 correspond to windows 1000 and 1005. While window 1000 is active, the user of the Sink 100 highlights an address 1010 ("4184 Winmore St.") using a multi-screen pointer 1015 in an MS Word document of window 1000. While the address 1010 is highlighted, assume that the user enters CTRL-C which triggers the Sink 100 to copy the address 1010 to its local buffer. Next, the multi-screen pointer 1015 moves to position 1020 of window 1005 which makes window 1005 the active window. Position 1020 is inside of a text entry portion 1025 of a chat window. The user clicks the multi-screen pointer 1015 at position 1020 of window 1005 and then enters CTRL-V, which causes the Sink 100 to send the address 1010 to Source 2 for insertion into the text entry portion of the chat window at position 1020.

Figure 11:
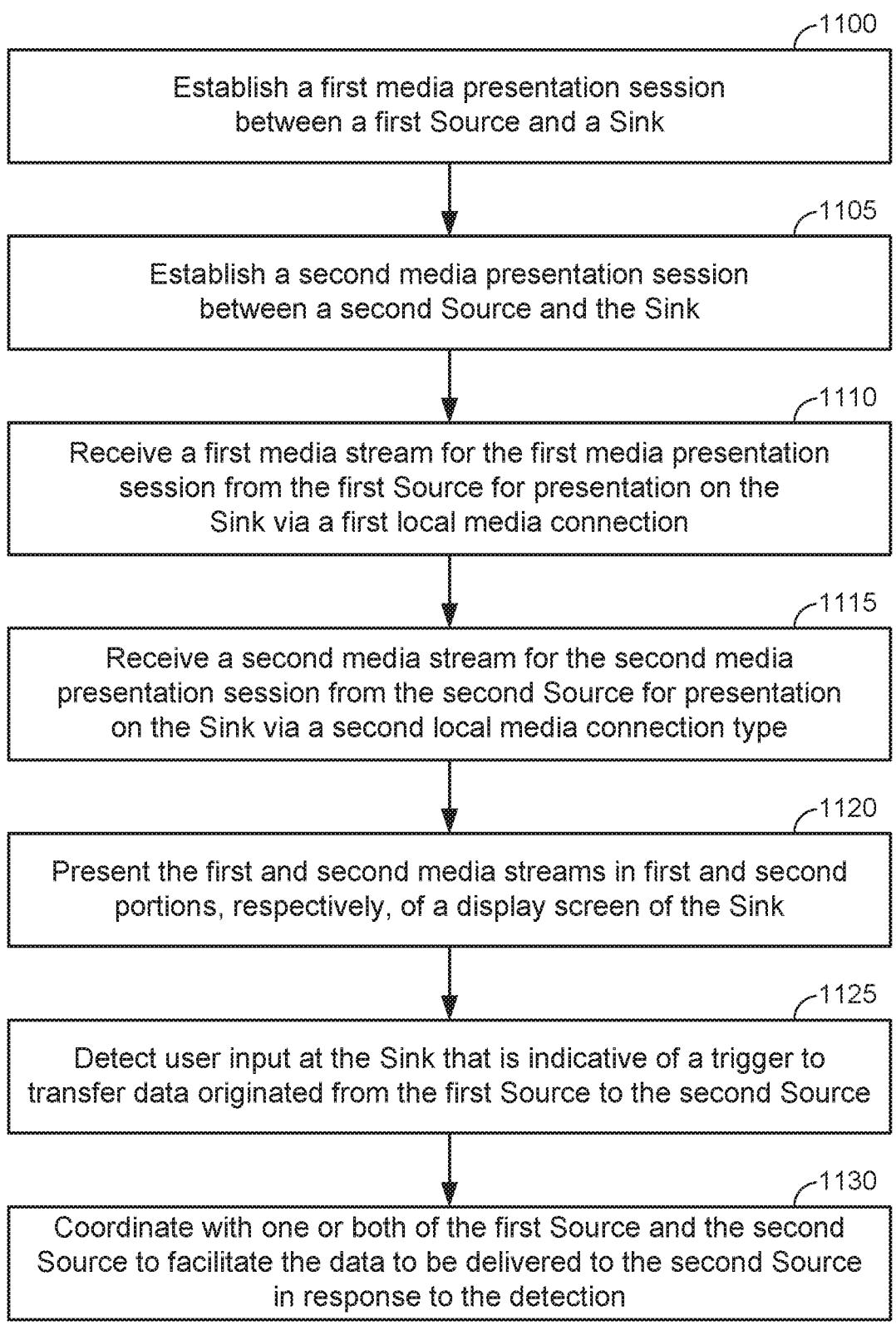
FIG. 11 illustrates a process by which a transfer of data between two Sources connected to a Sink can be facilitated in accordance with an embodiment of the disclosure.
Figure 12:
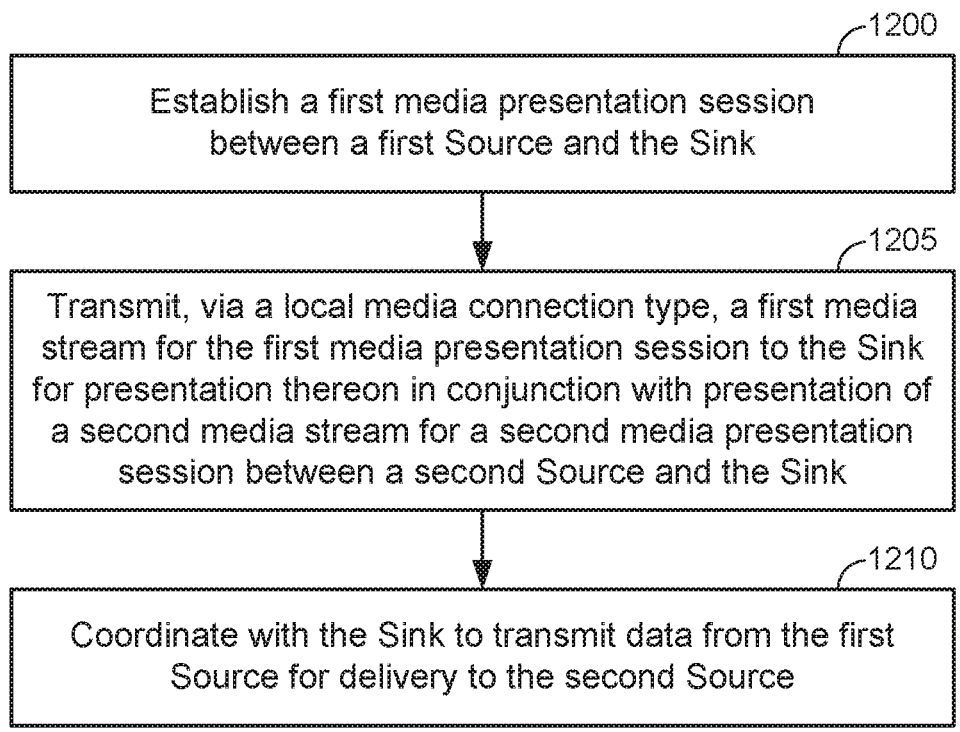
FIG. 12 illustrates a process by which a transfer of data between two Sources connected to a Sink can be facilitated in accordance with another embodiment of the disclosure.
Figure 13:
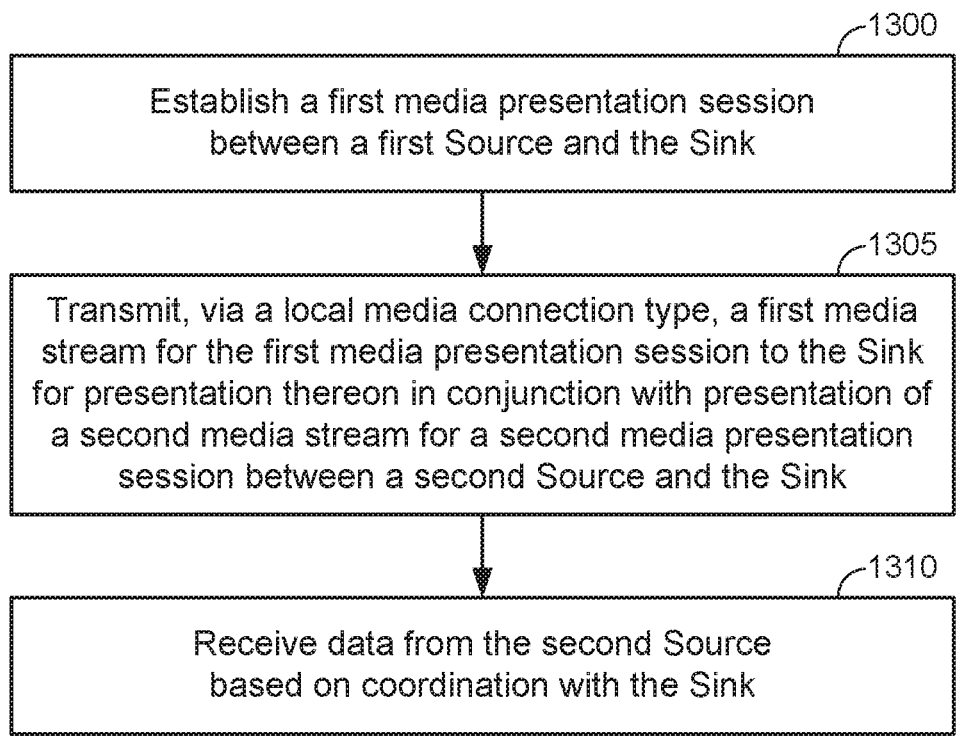
FIG. 13 illustrates a process by which a transfer of data between two Sources connected to a Sink can be facilitated in accordance with another embodiment of the disclosure.

FIGS. 11-13 each illustrate a process by which a transfer of data between two Sources connected to a Sink can be facilitated in accordance with embodiments of the disclosure. In particular, FIG. 11 illustrates a Source-to-Source data transfer facilitation procedure from the Sink perspective, FIG. 12 illustrates a Source-to-Source data transfer procedure from the perspective of a Source that transmits the data, and FIG. 13 illustrates a Source-to-Source data transfer procedure from the perspective of a Source that receives the data.

Referring to FIG. 11, at block 1100 (e.g., as in block 300 of FIG. 3, or block 500 of FIG. 5), a Sink establishes establishing a first media presentation session between a first Source and the Sink. At block 1105 (e.g., as in block 305 of FIG. 3, or block 505 of FIG. 5), the Sink establishes a second media presentation session between a second Source and the Sink. At block 1110 (e.g., as in block 310 of FIG. 3, or block 510 of FIG. 5), the Sink receives a first media stream for the first media presentation session from the first Source for presentation on the Sink via a first local media connection type. At block 1115 (e.g., as in block 315 of FIG. 3, or block 515 of FIG. 5), the Sink receives a second media stream for the second media presentation session from the second Source for presentation on the Sink via a second local media connection type. At block 1120 (e.g., as in block 320 of FIG. 3, or block 520 of FIG. 5), the Sink presents the first and second media streams in first and second portions, respectively, of a display screen of the Sink. At block 1125 (e.g., as in block 325 of FIG. 3, or block 535 of FIG. 5, or blocks 600-610 and 635-645 of FIG. 6, or block 800-810 and 835-845 of FIG. 8, or blocks 900-920 of FIG. 9), the Sink detects user input at the Sink that is indicative of a trigger to transfer data originated from the first Source to the second Source. At block 1130 (e.g., as in block 330 of FIG. 3, or blocks 540-550 of FIG. 5, or blocks 615-630 and 650-655 of FIG. 6, or block 855 of FIG. 8, or block 925 of FIG. 9), the Sink coordinates with one or both of the first Source and the second Source to facilitate the data to be delivered to the second Source in response to the detecting.

Referring to FIG. 12, at block 1200 (e.g., as in block 300 of FIG. 3, or block 500 of FIG. 5), a first Source establishes a first media presentation session between a first Source and a Sink. At block 1205, the first Source transmits (e.g., as in block 310 of FIG. 3, or block 510 of FIG. 5), via a local media connection type, a first media stream for the first media presentation session to the Sink for presentation thereon in conjunction with presentation of a second media stream for a second media presentation session between a second Source and the Sink. At block 1210, the first Source coordinates (e.g., as in block 330 of FIG. 3, or blocks 540 and 550 of FIG. 5, or blocks 615-630 of FIG. 6, or block 855 of FIG. 8) with the Sink to transmit data from the first Source for delivery to the second Source.

Referring to FIG. 13, at block 1300 (e.g., as in block 305 of FIG. 3, or block 505 of FIG. 5), a first Source establishes a first media presentation session between a first Source and a Sink. At block 1305 first Source transmits 1115 (e.g., as in block 315 of FIG. 3, or block 515 of FIG. 5), via a local media connection type, a first media stream for the first media presentation session to the Sink for presentation thereon in conjunction with presentation of a second media stream for a second media presentation session between a second Source and the Sink. At block 1310, the first Source receives data from the second Source based on coordination with the Sink (e.g., as in block 330 of FIG. 3, or block 545 of FIG. 5, or block 655 of FIG. 6, or block 860 of FIG. 8, or block 925 of FIG. 9).

While embodiments have generally been described with respect to two Sources (i.e., Sources 1 and 2) having two concurrent media presentation sessions with a common Sink, it will be appreciated that other embodiments can include any number of Sources (e.g., 3, 4, etc.) with a corresponding number of concurrently supported media presentation sessions being displayed on the common Sink. Further, while embodiments have generally been described with respect to video streaming, any of the above-noted embodiments may optionally include an audio component.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of facilitating a transfer of data between a plurality of Sources that are each connected to a Sink, comprising:
    establishing a first media presentation session between a first Source and the Sink;
    establishing a second media presentation session between a second Source and the Sink;
    receiving a first media stream for the first media presentation session from the first Source for presentation on the Sink via a first local media connection type;

receiving a second media stream for the second media presentation session from the second Source for presentation on the Sink via a second local media connection type;

presenting the first and second media streams in first and second portions, respectively, of a display screen of the Sink;

detecting user input at the Sink that is indicative of a trigger to transfer data originated from the first Source to the second Source, the data being parsed from or separate from the first media stream; and coordinating with one or both the first Source the second Source to facilitate the data to be delivered to the second Source in response to the detecting, wherein the data corresponds to a file that is stored on the first Source, and wherein the coordinating includes providing the first Source with instructions to send the file to the second Source via a peer-to-peer (P2P) connection.

2. The method of claim 1, wherein one or both of the first and second local media connection types correspond to a wireless local media connection type.

3. The method of claim 2, wherein the wireless local media connection type is Miracast.

4. The method of claim 1, wherein one or both of the first and second local media connection types correspond to a wired local media connection type.

5. The method of claim 1,
wherein the P2P connection is established before the coordinating, or
wherein the P2P connection is established as part of the coordinating.

6. The method of claim 1, wherein the coordinating further includes:
mediating, by the Sink, transfer of the file from the first Source to the second Source in response to an indication that an attempt by the first Source to send the file to the second Source via the P2P connection has failed.

7. The method of claim 1, wherein the data to be delivered to the second Source corresponds to content that is part of the first media stream.

8. The method of claim 7, wherein the data to be delivered to the second Source includes one or both of text and image data that is presented in the first portion of the display screen of the Sink by the presenting.

9. The method of claim 1, wherein the first portion corresponds to an active portion of the display screen in terms of user input via the Sink during the detecting.

10. The method of claim 9, wherein the second portion corresponds to an inactive portion of the display screen in terms of user input via the Sink during the detecting.

11. The method of claim 1,
wherein the data to be delivered to the second Source corresponds to content that is part of the first media stream, or
wherein the data to be delivered to the second Source is stored locally at the first Source which is not part of the first media stream.

12. The method of claim 1, wherein the detected user input corresponds to one or more of:
a user of the Sink dragging a file from the first portion of the display screen of the Sink to the second portion of the display screen of the Sink via a multi-screen pointer to trigger a transfer of the file from the first Source to the second Source, or
the user of the Sink copying one or both of text and image content from the first portion and then designating a location in the second portion at which to paste the copied one or both of text and image content.

13. The method of claim 1,
wherein one or both of the first and second media streams include video only, or
wherein one or both of the first and second media streams include both video and audio.

14. A method of transferring data between a plurality of Sources that are each connected to a Sink, comprising:
establishing a first media presentation session between a first Source and the Sink;
transmitting, via a local media connection type, a first media stream for the first media presentation session to the Sink for presentation thereon in conjunction with presentation of a second media stream for a second media presentation session between a second Source and the Sink; and
coordinating with the Sink to transmit data from the first Source for delivery to the second Source, the data being parsed from or separate from the first media stream,
wherein the data corresponds to a file that is stored on the first Source, and
wherein the coordinating includes:
receiving instructions from the Sink to send the file to the second Source via a peer-to-peer (P2P) connection, and
attempting to transmit the file to the second Source via the P2P connection.

15. The method of claim 14, wherein the local media connection type corresponds to a wireless local media connection type.

16. The method of claim 15, wherein the wireless local media connection type is Miracast.

17. The method of claim 14, wherein the local media connection type corresponds to a wired local media connection type.

18. The method of claim 14,
wherein the P2P connection is established before the coordinating, or
wherein the P2P connection is established as part of the coordinating.

19. The method of claim 14, wherein the coordinating further includes:
transmitting, to the Sink, a request for the Sink to mediate transfer of the file from the first Source to the second Source in response to a determination that the attempt to transmit the file to the second Source via the P2P connection has failed.

20. The method of claim 14, wherein the coordinating includes transmitting the data to be delivered to the second Source via the local media connection type as content that is part of the first media stream.

21. The method of claim 20, wherein the data to be delivered to the second Source includes one or both of text and image data within the first media stream.

22. The method of claim 14, wherein the coordinating is triggered based on user input that is detected at the Sink within a portion of a display screen that displays the first media stream.

23. The method of claim 14,
wherein one or both of the first and second media streams include video only, or
wherein one or both of the first and second media streams include both video and audio.

24. A method of transferring data between a plurality of Sources that are each connected to a Sink, comprising:

establishing a first media presentation session between a first Source and the Sink;

transmitting, via a local media connection type, a first media stream for the first media presentation session to the Sink for presentation thereon in conjunction with presentation of a second media stream for a second media presentation session between a second Source and the Sink; and receiving data from the second Source based on coordination with the Sink, the data being parsed from or separate from the second media stream, wherein the data corresponds to a file that is stored on the second Source, and wherein the receiving receives the file from the second Source via a peer-to-peer (P2P) connection.

25. The method of claim 24, wherein the local media connection type corresponds to a wireless local media connection type.

26. The method of claim 25, wherein the wireless local media connection type is Miracast.

27. The method of claim 24, wherein the local media connection type corresponds to a wired local media connection type.

28. The method of claim 24,
wherein the P2P connection is established before the receiving, or
wherein the P2P connection is established in conjunction with the receiving.

29. The method of claim 24, wherein the receiving is triggered based on user input that is detected at the Sink within a portion of a display screen that displays the second media stream.

30. The method of claim 24,
wherein one or both of the first and second media streams include video only, or
wherein one or both of the first and second media streams include both video and audio.

31. A Sink configured to facilitate a transfer of data between a plurality of Sources that are each connected to the Sink, comprising:
means for establishing a first media presentation session between a first Source and the Sink;
means for establishing a second media presentation session between a second Source and the Sink;
means for receiving a first media stream for the first media presentation session from the first Source for presentation on the Sink via a first local media connection type;
means for receiving a second media stream for the second media presentation session from the second Source for presentation on the Sink via a second local media connection type;
means for presenting the first and second media streams in first and second portions, respectively, of a display screen of the Sink;
means for detecting user input at the Sink that is indicative of a trigger to transfer data originated from the first Source to the second Source, the data being parsed from or separate from the first media stream; and
means for coordinating with one or both of the first Source and the second Source to facilitate the data to be delivered to the second Source in response to the detection,
wherein the data corresponds to a file that is stored on the first Source, and wherein the means for coordinating provides the first Source with instructions to send the file to the second Source via a peer-to-peer (P2P) connection.

32. The Sink of claim 31,
wherein one or both of the first and second local media connection types correspond to a wireless local media connection type, or
wherein one or both of the first and second local media connection types correspond to a wired local media connection type.

33. The Sink of claim 31, wherein the data to be delivered to the second Source corresponds to content that is part of the first media stream.

34. The Sink of claim 31, wherein the first portion corresponds to an active portion of the display screen in terms of user input via the Sink during the detection.

35. A first Source among a plurality of Sources that are each connected to a Sink, comprising:
means for establishing a first media presentation session between the first Source and the Sink;
means for transmitting, via a local media connection type, a first media stream for the first media presentation session to the Sink for presentation thereon in conjunction with presentation of a second media stream for a second media presentation session between a second Source and the Sink; and
means for coordinating with the Sink to transmit data from the first Source for delivery to the second Source, the data being parsed from or separate from the first media stream,
wherein the data corresponds to a file that is stored on the first Source, and
wherein the means for coordinating receives instructions from the Sink to send the file to the second Source via a peer-to-peer (P2P) connection, and attempts to transmit the file to the second Source via the P2P connection.

36. The first Source of claim 35,
wherein the local media connection type corresponds to a wireless local media connection type, or
wherein the local media connection type corresponds to a wired local media connection type.

37. A first Source among a plurality of Sources that are each connected to a Sink, comprising:
means for establishing a first media presentation session between the first Source and the Sink;
means for transmitting, via a local media connection type, a first media stream for the first media presentation session to the Sink for presentation thereon in conjunction with presentation of a second media stream for a second media presentation session between a second Source and the Sink; and
means for receiving data from the second Source based on coordination with the Sink, the data being parsed from or separate from the second media stream,
wherein the data corresponds to a file that is stored on the second Source, and
wherein the means for receiving receives the file from the second Source via a peer-to-peer (P2P) connection.

38. The first Source of claim 37,
wherein the local media connection type corresponds to a wireless local media connection type, or
wherein the local media connection type corresponds to a wired local media connection type.

39. A Sink configured to facilitate a transfer of data between a plurality of Sources that are each connected to the Sink, comprising:

at least one communications interface configured to establish a first media presentation session between a first Source and the Sink, to establish a second media presentation session between a second Source and the Sink, to receive a first media stream for the first media presentation session from the first Source for presentation on the Sink via a first local media connection type, and to receive a second media stream for the second media presentation session from the second Source for presentation on the Sink via a second local media connection type;

at least one user interface (UI) output component configured to present the first and second media streams in first and second portions, respectively, of a display screen of the Sink; and at least one UI input component configured to detect user input at the Sink that is indicative of a trigger to transfer data originated from the first Source to the second Source, the data being parsed from or separate from the first media stream, wherein the at least one communications interface is further configured to coordinate with one or both of the first Source and the second Source to facilitate the data to be delivered to the second Source in response to the detection, wherein the data corresponds to a file that is stored on the first Source, and wherein the at least one communications interface coordinates with one or both of the first Source and the second Source to facilitate the data to be delivered by providing the first Source with instructions to send the file to the second Source via a peer-to-peer (P2P) connection.

40. The Sink of claim 39,
wherein one or both of the first and second local media connection types correspond to a wireless local media connection type, or
wherein one or both of the first and second local media connection types correspond to a wired local media connection type.

41. The Sink of claim 39, wherein the data to be delivered to the second Source corresponds to content that is part of the first media stream.

42. The Sink of claim 39, wherein the first portion corresponds to an active portion of the display screen in terms of user input via the Sink during the detection.

43. A first Source among a plurality of Sources that are each connected to a Sink, comprising:
at least one communications interface configured to establish a first media presentation session between the first Source and the Sink, to transmit, via a local media connection type, a first media stream for the first media presentation session to the Sink for presentation thereon in conjunction with presentation of a second media stream for a second media presentation session between a second Source and the Sink, and to coordinate with the Sink to transmit data from the first Source for delivery to the second Source, the data being parsed from or separate from the first media stream,
wherein the data corresponds to a file that is stored on the first Source, and
wherein the at least one communications interface coordinates with the Sink to transmit the data by receiving instructions from the Sink to send the file to the second Source via a peer-to-peer (P2P) connection, and attempting to transmit the file to the second Source via the P2P connection.

44. The first Source of claim 43,
wherein the local media connection type corresponds to a wireless local media connection type, or
wherein the local media connection type corresponds to a wired local media connection type.

45. A first Source among a plurality of Sources that are each connected to a Sink, comprising:
at least one communications interface configured to establish a first media presentation session between the first Source and the Sink, to transmit, via a local media connection type, a first media stream for the first media presentation session to the Sink for presentation thereon in conjunction with presentation of a second media stream for a second media presentation session between a second Source and the Sink, and to receive data from the second Source based on coordination with the Sink, the data being parsed from or separate from the second media stream,
wherein the data corresponds to a file that is stored on the second Source, and
wherein the at least one communications interface receives the file from the second Source via a peer-to-peer (P2P) connection.

46. The first Source of claim 45,
wherein the local media connection type corresponds to a wireless local media connection type, or
wherein the local media connection type corresponds to a wired local media connection type.

47. A non-transitory computer-readable medium containing instructions stored thereon, which, when executed by a Sink configured to facilitate a transfer of data between a plurality of Sources that are each connected to the Sink, cause the Sink to perform operations, the instructions comprising:
at least one instruction configured to cause the Sink to establish a first media presentation session between a first Source and the Sink;
at least one instruction configured to cause the Sink to establish a second media presentation session between a second Source and the Sink;
at least one instruction configured to cause the Sink to receive a first media stream for the first media presentation session from the first Source for presentation on the Sink via a first local media connection type;
at least one instruction configured to cause the Sink to receive a second media stream for the second media presentation session from the second Source for presentation on the Sink via a second local media connection type;
at least one instruction configured to cause the Sink to present the first and second media streams in first and second portions, respectively, of a display screen of the Sink;
at least one instruction configured to cause the Sink to detect user input at the Sink that is indicative of a trigger to transfer data originated from the first Source to the second Source, the data being parsed from or separate from the first media stream; and
at least one instruction configured to cause the Sink to coordinate with one or both of the first Source and the second Source to facilitate the data to be delivered to the second Source in response to the detection,
wherein the data corresponds to a file that is stored on the first Source, and
wherein the at least one instruction configured to cause the Sink to coordinate causes the Sink to provide the first Source with instructions to send the file to the second Source via a peer-to-peer (P2P) connection.

48. The non-transitory computer-readable medium of claim 47,
wherein one or both of the first and second local media connection types correspond to a wireless local media connection type, or
wherein one or both of the first and second local media connection types correspond to a wired local media connection type.

49. The non-transitory computer-readable medium of claim 47, wherein the data to be delivered to the second Source corresponds to content that is part of the first media stream.

50. The non-transitory computer-readable medium of claim 47, wherein the first portion corresponds to an active portion of the display screen in terms of user input via the Sink during the detection.

51. A non-transitory computer-readable medium containing instructions stored thereon, which, when executed by a first Source among a plurality of Sources that are each connected to a Sink, cause the first Source to perform operations, the instructions comprising:
at least one instruction configured to cause the first Source to establish a first media presentation session between the first Source and the Sink;
at least one instruction configured to cause the first Source to transmit, via a local media connection type, a first media stream for the first media presentation session to the Sink for presentation thereon in conjunction with presentation of a second media stream for a second media presentation session between a second Source and the Sink; and
at least one instruction configured to cause the first Source to coordinate with the Sink to transmit data from the first Source for delivery to the second Source, the data being parsed from or separate from the first media stream,
wherein the data corresponds to a file that is stored on the first Source, and
wherein the at least one instruction configured to cause the first Source to coordinate causes the first Source to receive instructions from the Sink to send the file to the second Source via a peer-to-peer (P2P) connection, and to attempt to transmit the file to the second Source via the P2P connection.

52. The non-transitory computer-readable medium of claim 51,
wherein the local media connection type corresponds to a wireless local media connection type, or
wherein the local media connection type corresponds to a wired local media connection type.

53. A non-transitory computer-readable medium containing instructions stored thereon, which, when executed by a first Source among a plurality of Sources that are each connected to a Sink, cause the first Source to perform operations, the instructions comprising:
at least one instruction configured to cause the first Source to establish a first media presentation session between the first Source and the Sink;
at least one instruction configured to cause the first Source to transmit, via a local media connection type, a first media stream for the first media presentation session to the Sink for presentation thereon in conjunction with presentation of a second media stream for a second media presentation session between a second Source and the Sink; and
at least one instruction configured to cause the first Source to receive data from the second Source based on coordination with the Sink, the data being parsed from or separate from the second media stream,
wherein the data corresponds to a file that is stored on the second Source, and
wherein the at least one instruction configured to cause the first Source to receive causes the first Source to receive the file from the second Source via a peer-to-peer (P2P) connection.

54. The non-transitory computer-readable medium of claim 53,
wherein the local media connection type corresponds to a wireless local media connection type, or
wherein the local media connection type corresponds to a wired local media connection type.

* * * * *